United States Patent
Dejneka et al.

(10) Patent No.: US 11,351,756 B2
(45) Date of Patent: Jun. 7, 2022

(54) LAMINATE GLASS CERAMIC ARTICLES WITH UV- AND NIR-BLOCKING CHARACTERISTICS AND METHODS OF MAKING THE SAME

(71) Applicant: CORNING INCORPORATED, Corning, NY (US)

(72) Inventors: Matthew John Dejneka, Corning, NY (US); Jesse Kohl, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/771,893

(22) PCT Filed: Dec. 13, 2018

(86) PCT No.: PCT/US2018/065339
§ 371 (c)(1),
(2) Date: Jun. 11, 2020

(87) PCT Pub. No.: WO2019/118664
PCT Pub. Date: Jun. 20, 2019

(65) Prior Publication Data
US 2021/0070018 A1    Mar. 11, 2021

Related U.S. Application Data

(60) Provisional application No. 62/599,517, filed on Dec. 15, 2017.

(51) Int. Cl.
B32B 15/04    (2006.01)
B32B 17/06    (2006.01)
(Continued)

(52) U.S. Cl.
CPC ............ *B32B 17/101* (2013.01); *B32B 7/027* (2019.01); *B32B 17/06* (2013.01);
(Continued)

(58) Field of Classification Search
CPC ........................................................ B32B 17/06
(Continued)

(56) References Cited

U.S. PATENT DOCUMENTS 2,952,575 A    9/1960  Baltzer
3,457,106 A    7/1969  Gillery
(Continued)

FOREIGN PATENT DOCUMENTS

AU    2003214255 A1    12/2003
CN    1653007 A    8/2005
(Continued)

OTHER PUBLICATIONS

C.-J Chen, D.-H. Chen, "Preparation and near-infrared photothermal conversion property of cesium tungsten oxide nanoparticles", Nanoscale Res. Lett., 8, 57 (2013).
(Continued)

*Primary Examiner* — Lauren R Colgan
(74) *Attorney, Agent, or Firm* — Daniel J. Greenhalgh

(57) ABSTRACT

A laminate glass-ceramic article is provided that includes: a core glass layer having a first coefficient of thermal expansion (CTE); and a plurality of clad glass-ceramic layers, each having a CTE that is lower than or equal to the first CTE of the core glass layer. A first of the clad glass-ceramic layers is laminated to a first surface of core glass layer and a second of the clad glass-ceramic layers is laminated to a second surface of the core glass layer. Further, a total thickness of the plurality of clad glass-ceramic layers is from about 0.05 mm to about 0.5 mm. In addition, each of the glass-ceramic layers includes: an alumino-boro-silicate
(Continued)

glass, 0 mol %≤MoO3≤15 mol %, and 0 mol %≤WO3≤15 mol %, the WO3 (mol %) plus the MoO3 (mol %) is from 0.7 mol % to 19 mol %.

26 Claims, 7 Drawing Sheets

(51) Int. Cl.
B32B 17/10 (2006.01)
C03C 3/091 (2006.01)
C03C 4/08 (2006.01)
B32B 7/027 (2019.01)
C03C 21/00 (2006.01)

(52) U.S. Cl.
CPC .. *B32B 17/10045* (2013.01); *B32B 17/10678* (2013.01); *C03C 3/091* (2013.01); *C03C 4/082* (2013.01); *C03C 4/085* (2013.01); *B32B 2250/03* (2013.01); *B32B 2250/40* (2013.01); *B32B 2307/42* (2013.01); *B32B 2307/71* (2013.01); *B32B 2315/08* (2013.01); *C03C 21/002* (2013.01)

(58) Field of Classification Search
USPC .................................................. 428/426, 428
See application file for complete search history.

(56) References Cited

U.S. PATENT DOCUMENTS

| | | | |
|---|---|---|---|
| 3,499,775 | A | 3/1970 | Albinak et al. |
| 3,505,108 | A | 4/1970 | Mochel |
| 4,303,298 | A | 12/1981 | Yamashita |
| 5,565,388 | A | 10/1996 | Krumwiede et al. |
| 5,566,428 | A | 10/1996 | Takahashi |
| 6,048,621 | A | 4/2000 | Gallego et al. |
| 6,114,264 | A | 9/2000 | Krumwiede et al. |
| 6,196,027 | B1 | 3/2001 | Varanasi et al. |
| 6,274,523 | B1 | 8/2001 | Krumwiede et al. |
| 6,911,254 | B2 | 6/2005 | Fisher et al. |
| 7,192,897 | B2 | 3/2007 | Yamane et al. |
| 7,517,822 | B2 | 4/2009 | Fechner et al. |
| 8,268,202 | B2 | 9/2012 | Mamak et al. |
| 8,268,460 | B2 | 9/2012 | Fujita |
| 8,277,702 | B2 | 10/2012 | Chang et al. |
| 10,246,371 | B1 | 4/2019 | Dejneka et al. |
| 2002/0072461 | A1 | 6/2002 | Akimoto et al. |
| 2005/0151116 | A1 | 7/2005 | Fechner et al. |
| 2008/0254301 | A1* | 10/2008 | Fechner .................. C03C 4/085 428/432 |
| 2009/0035341 | A1 | 2/2009 | Wagener et al. |
| 2009/0129061 | A1 | 5/2009 | Fechner et al. |
| 2014/0141217 | A1 | 5/2014 | Gulati et al. |
| 2014/0256865 | A1 | 9/2014 | Boulton et al. |
| 2015/0093554 | A1 | 4/2015 | Estinto et al. |
| 2016/0121583 | A1* | 5/2016 | Edwards .............. B23K 26/206 428/215 |
| 2018/0162768 | A1* | 6/2018 | Boek ..................... C03B 17/064 |
| 2019/0177206 | A1* | 6/2019 | Dejneka ................ C03C 14/006 |
| 2020/0002220 | A1 | 1/2020 | Dejneka et al. |
| 2020/0399167 | A1* | 12/2020 | Dejneka .................. B60J 3/007 |

FOREIGN PATENT DOCUMENTS

| | | |
|---|---|---|
| DE | 10353756 A1 | 6/2005 |
| EP | 2217533 A2 | 8/2010 |
| JP | 2010-008908 A | 1/2010 |
| KR | 10-2005-0025182 A | 3/2005 |
| TW | 264422 B | 12/1995 |
| WO | 2003/097544 A1 | 11/2003 |
| WO | 2009/059901 A2 | 5/2009 |

OTHER PUBLICATIONS

F. Shi, J. Liu, X. Dong, Q. Xu, J. Luo, H. Ma, "Hydrothermal Synthesis of CsxWO3 and the Effects of N2 annealing on its Microstructure and Heat Shielding Properties", J. Mater. Sci. Technol., 30 [4], 342 (2014).
G. Poirier, F. S. Ottoboni, F. C. Cassanjes, A. Remonte, Y. Messaddeq, and S. J. K. Ribeiro, "Redox Behavior of Molybdenum and Tungsten in Phosphate Glasses", J. Phys. Chem. B, 112(15), 4481 (2008).
H. Tanaka, T Yazawa, K Eguchi, "Phase Separation of Borosilicate Glass with Molybdenum Oxide Addition and Pore Structure of Porous Glass", J. Ceram. Assoc. Japn, vol. 93 [1083], 700-707 (1985).
H. Tawarayama, F. Utsuno, H. Inoue, H. Hosono, and H. Kawazoe, "Coloration and Decoloration of Tungsten Phosphate Glasses by Heat Treatments at the Temperature Far below Tg", Chem. Mater. 18, 2810 (2006).
International Search Report and Written Opinion of the International Searching Authority; PCT/US2018/065339; dated Apr. 2, 2019; 11 Pages; Korean Intellectual Property Office.
J. Y. Kim, H. J. Yoon, E. K. Kim, S. Y. Jeong, G. J. Shin, S. Lee, and K. H. Choi, "Near Infrared Cut-off Characteristics of various Perovskite-based Composite Films", IPCBEE, 43, 9 (2012).
K. Adachi, Y. Ota, H. Tanaka, M. Okada, N. Oshimura, and A. Tofuku, "Chromatic instabilities in cesium-doped tungsten bronze nanoparticles", J. Appl. Phys., 115 194304 (2013).
K. Moon, J. J. Cho, Y. -B. Lee, P. J. Yoo, C. W. Bark, and J. Park, "Near Infrared Shielding Properties of Quarternary Tungsten bronze Nanoparticles Na0.11Cs0.22WO3", Bull. Korean Chem. Soc. 34 [3], 731 (2013).
K.A. Kaliyev, "What are Tungsten Bronzes", EIR vol. 20, No. 17, Apr. 30, 1993.
L. Brickwedel, J. E. Shelby, "Formation and properties of sodium tungsten borate glasses", Phys. Chem. Glasses: Eur. J. Glass Sci. Technol. B, 5, 598 (2006).
M. Green and Z. Hussain, "Optical properties of dilute hydrogen tungsten bronze thin films", J. Appl. Phys. 74, 3451 (1993).
M. Green and Z. Hussain, "Optical properties of lithium tungsten bronze thin films", J. Appl. Phys. 81, 3592 (1997).
M. von Dirke, S. Müller, K. Bärner, and H. Rager, "Cluster formation of WO3 in Li2B4O7 glasses", J. Non Crys. Sol., 124, 265 (1990).
P. G. Dickens and M. S. Whittingham, "The Tungsten Bronzes and Related Compounds", J. Amer. Chem. Soc., 81, 5556 (1981).
S. Sakka, "Formation of Tungsten Bronze and Other Electrically Conducting Crystals by Crystallization of Glasses Containing Alkali and Tungsten Oxide", Bull. Inst. Chem. Res., Kyoto Univ., 48 [4-5], 185 (1970).
Sayed et al., "Some properties of sodium tungsten bronzes as a function of sodium concentration", Indian Journal of Chem. Tech., vol. 12, May 2005, pp. 304-308.
Vitro Architectural Glass, "Radio and Microwave Frequency Attenuation in Glass", Glass Technical Document (TD-151), pp. 1-5.
X. Zeng, Y. Zhou, S. Ji, H. Luo, H. Yao, X. Huang, and P. Jin, "The preparation of a high performance near-infrared shielding CsxWO3/SiO2 composite resin coating and research on its optical stability under ultraviolet illumination", J. Mater. Chem. C, 3, 8050 (2015).

* cited by examiner

LAMINATE GLASS CERAMIC ARTICLES WITH UV- AND NIR-BLOCKING CHARACTERISTICS AND METHODS OF MAKING THE SAME

CROSS-REFERENCE TO RELATED APPLICATIONS

This application claims the benefit of priority under 35 U.S.C. § 371 of International Application No. PCT/US2018/065339, filed on Dec. 13, 2018, which claims the benefit of priority under 35 U.S.C. § 119 of U.S. Provisional Application No. 62/599,517, filed Dec. 15, 2017, the content of each of which is incorporated herein by reference in its entirety.

FIELD OF THE DISCLOSURE

The disclosure relates to laminate glass-ceramic articles with UV- and NIR-blocking attributes, and more particularly, laminate articles and patterned laminate articles that comprise tungsten oxide-doped, mixed molybdenum-tungsten oxide-doped, and molybdenum oxide-doped aluminoborosilicate compositions. The disclosure also relates to methods of making these articles.

BACKGROUND

Near infrared (NIR) shielding glasses are being employed to block wavelengths ranging from 700-3500 nm for applications including optical filters, ophthalmic lenses, and glazing for automotive, architectural, medical, defense, aerospace, and other consumer applications. In the case of architectural and automotive glazing, decreasing the amount of ultraviolet (UV) and NIR transmission reduces energy consumption because there is a reduced demand for air conditioning. This is especially significant for all-electric vehicles currently for sale and in development. With the trend toward utilizing thinner glass for automotive and architectural glazing for light-weighting, improved management of UV, visible and NIR radiation may be developed in tandem to fully leverage the benefit of thin glass. This is due to the fact that as the path length of the glazing is decreased, the amount of light transmittance increases.

The key challenge in achieving greater UV and IR absorbance in conventional absorptive tinted glasses is radiation trapping during melting. When a sufficiently large quantity (≥1.5 wt %) of an IR-absorbing species (commonly $Fe^{2+}$) is introduced to a glass melted in a gas-fired continuous melter (e.g., a float tank), the IR wavelengths are absorbed by the surface of the glass and very little heat from the overhead burners penetrates to the tank bottom. This results in cold zones in the lower region of the melter. Conversely, in tanks that are predominately Joule heated with submerged electrodes, the core of the furnace can become super-heated because the IR-absorbing glass is self-insulating. Irrespective of how the furnace is heated, radiation trapping of strongly IR-absorbing glass can prevent the glass from losing enough heat to reach a forming temperature within the process footprint of most furnace designs. Thus, it is difficult to get heat into IR-absorbing glasses to melt them and to extract the heat back out to form them. To manufacture such a glass, significant, costly modifications to the melter may be required to accommodate such glasses. In turn, due to the limited dopant concentrations available for these glasses, there is a finite range of optical path lengths for which a desired transmittance specification can be achieved with any of these conventional, absorptive tinted glasses.

Alternate technologies for light management have been considered that could enable a lightweight, reduced thickness substrate assembly to meet both the automotive windshield and sunroof transmittance specifications. These assemblies include solar-absorbing interlayers and multilayer films between glass substrates and/or NIR reflective coatings and multilayers on a glass substrate. However, these alternate technologies have some key limitations, particularly cost, that have prevented them from being widely adopted by automotive glazing makers. For example, solar-absorbing interlayers are generally comprised of a thermoplastic polymeric sheet, commonly polyvinyl butyral (PVB) that is doped with particles of NIR-absorbing species, such as lanthanum hexaboride ($LaB_6$), indium tin oxide (ITO), antimony tin oxide (ATO), organic dyes, and/or pigments. These glass substrates with solar-absorbing interlays can also be multilayer structures having at least one polymeric interlayer wherein the dopants are dispersed in or coated on the interlayer. Color-adjusting dyes and infrared-absorbing dyes can further enhance the solar attenuating performance of these assemblies. Solar-absorptive films can also be used in tandem with reflective films and multilayer structures, such as metallized polyethylene terephthalate (PET), which can be embossed with a pattern. Nevertheless, the cost of these engineered solar-absorbing interlayers and related structures is particularly high, well higher than the cost of clear/un-tinted PVB that is used in conventional laminated glazing.

As another example of a conventional light management technology, reflective coatings and films (commonly referred to as low-emissivity (low-E) coatings) have also been employed on glass substrates. Low-E coatings minimize the amount of UV and NIR light that can pass through glass, without compromising the amount of visible light that is transmitted. For use as sunroof glazing, the coating may be modified to reflect visible wavelengths and/or be used in combination with a tinted interlayer (e.g., dyed PVB). There are currently two basic processes for making low-E coatings-sputtered and pyrolytic. Sputtered coatings are typically produced as multilayered coatings (e.g., 3-13 layers) that are typically comprised of metals (commonly silver), metal oxides, and metal nitrides. Because silver is an inherently soft material and susceptible to corrosion, the coating must be surrounded by other materials (barrier layers) to prevent exposure to ambient air. Thus, sputtered coatings were historically described as "soft-coat, low-E coatings" because they offered little resistance to chemical or mechanical attack. As such, most sputtered coatings are not sufficiently durable to be used in monolithic, light management applications. Further, light management technologies that rely on low-E coatings are typically high in cost, given the level of process complexity needed to produce them and the additional layers that must be added to fully achieve the optical requirements of the application.

A typical pyrolytic coating is a metallic oxide, most commonly tin oxide with some additives, bonded to the glass while it is in a semi-molten state. The result is a 'baked-on' surface layer that is quite hard and durable, which is why pyrolytic low-E coatings are sometimes referred to as "hard-coat, low-E coatings". These coatings can be exposed to ambient air and cleaned with traditional glass cleaning products and techniques without damaging the coating. Because of their inherent chemical and mechanical durability, pyrolytic coatings have had success in being employed in monolithic, light management applications, specifically for architecture. Nevertheless, these pyrolytic coating-related, light management technologies are also high in raw material and process-related cost, and do not perform as well as sputtered low-E coatings.

While low-E reflective coating technologies have been widely used in architecture for decades, these technologies have not been adopted by the automotive industry, particularly automotive glazing manufacturers. As highlighted earlier, the primary reason for the lack of penetration of low-E reflective coating technologies is cost. Besides having cost drawbacks, reflective coating technologies also pose several technical challenges when deployed in automotive glazing. They may require moisture protection and, in-turn, careful sealing of the laminate edges. They typically impart visible color(s) in reflection, and not the desired neutral grey hue. Additionally, it is more costly to coat a curved part (e.g., an automotive moon roof) than a planar one. Most significantly, reflective coatings block radio frequencies (RF), and are so effective in doing so that one glass manufacturer markets an RF security glass with two silver layers that can attenuate up to 54 dBs. That is nearly as much attenuation as provided by a ⅛" thick, solid aluminum plate. For a vehicle with a metal body and large windows, RF absorptive glazing poses a problem, especially as with the increasing number of wireless devices and sensors that are being integrated. While there are workarounds for RF absorption, such as RF receivers and antennae, these solutions add even more cost and process complexity.

Accordingly, there is a need for low cost and low weight configurations (and methods of making them) with optical properties that are suitable for various UV- and IR-shielding applications, including but not limited to window, window glazing and optical filter applications.

SUMMARY OF THE DISCLOSURE

According to some aspects of the present disclosure, a laminate glass-ceramic article is provided that includes: a core glass layer having a first coefficient of thermal expansion (CTE); and a plurality of clad glass-ceramic layers, each having a CTE that is lower than or equal to the first CTE of the core glass layer. A first of the clad glass-ceramic layers is laminated to a first surface of core glass layer and a second of the clad glass-ceramic layers is laminated to a second surface of the core glass layer. Further, a total thickness of the plurality of clad glass-ceramic layers is from about 0.05 mm to about 0.5 mm. In addition, each of the glass-ceramic layers includes: an alumino-boro-silicate glass, 0 mol %≤$MoO_3$≤15 mol %, and 0 mol %≤$WO_3$≤15 mol %, the $WO_3$ (mol %) plus the $MoO_3$ (mol %) is from 0.7 mol % to 19 mol %.

According to other aspects of the present disclosure, a laminate glass-ceramic article is provided that includes: a core glass layer having a first coefficient of thermal expansion (CTE); and a plurality of clad glass-ceramic layers, each having a CTE that is lower than or equal to the first CTE of the core glass layer. A first of the clad glass-ceramic layers is laminated to a first surface of core glass layer and a second of the clad glass-ceramic layers is laminated to a second surface of the core glass layer. Further, a total thickness of the plurality of clad glass-ceramic layers is from about 0.05 mm to about 0.5 mm. In addition, each of the glass-ceramic layers includes: an alumino-boro-silicate glass, 0 mol %≤$MoO_3$≤15 mol %, and 0 mol %≤$WO_3$≤15 mol %, the $WO_3$ (mol %) plus the $MoO_3$ (mol %) is from 0.7 mol % to 19 mol %. Further, each of the glass-ceramic layers comprises a glassy phase and at least one crystalline phase selected from the group consisting of a stoichiometric crystalline phase, a non-stoichiometric crystalline phase and a mixed stoichiometric and non-stoichiometric crystalline phase.

According to further aspects of the disclosure, a laminate glass-ceramic article is provided that includes: a core glass-ceramic layer having a first coefficient of thermal expansion (CTE); and a plurality of clad glass layers, each having a CTE that is lower than or equal to the first CTE of the core glass-ceramic layer. A first of the clad glass layers is laminated to a first surface of core glass-ceramic layer and a second of the clad glass layers is laminated to a second surface of the core glass-ceramic layer. Further, a total thickness of the plurality of clad glass layers is from about 0.05 mm to about 0.5 mm. In addition, the core glass-ceramic layer includes: an alumino-boro-silicate glass, 0 mol %≤$MoO_3$≤15 mol %, and 0 mol %≤$WO_3$≤15 mol %, the $WO_3$ (mol %) plus the $MoO_3$ (mol %) is from 0.7 mol % to 19 mol %.

According to other aspects of the disclosure, a window is provided that comprises a laminate glass-ceramic article that includes: a core glass layer having a first coefficient of thermal expansion (CTE); and a plurality of clad glass-ceramic layers, each having a CTE that is lower than or equal to the first CTE of the core glass layer. A first of the clad glass-ceramic layers is laminated to a first surface of core glass layer and a second of the clad glass-ceramic layers is laminated to a second surface of the core glass layer. Further, a total thickness of the plurality of clad glass-ceramic layers is from about 0.05 mm to about 0.5 mm. In addition, each of the glass-ceramic layers includes: an alumino-boro-silicate glass, 0 mol %≤$MoO_3$≤15 mol %, and 0 mol %≤$WO_3$≤15 mol %, the $WO_3$ (mol %) plus the $MoO_3$ (mol %) is from 0.7 mol % to 19 mol %. Further, the laminate glass-ceramic article further comprises: (a) a total transmittance of less than or equal to 5% at ultraviolet (UV) wavelengths below 390 nm, (b) a total transmittance from about 1% to about 15% in the near infrared (NIR) spectrum from 700 nm to 1500 nm, and (c) a total transmittance from about 1% to about 30% in the visible spectrum from 400 nm to 700 nm.

According to additional aspects of the disclosure, a window is provided that comprises a laminate glass-ceramic article that includes: a core glass layer having a first coefficient of thermal expansion (CTE); and a plurality of clad glass-ceramic layers, each having a CTE that is lower than or equal to the first CTE of the core glass layer. A first of the clad glass-ceramic layers is laminated to a first surface of core glass layer and a second of the clad glass-ceramic layers is laminated to a second surface of the core glass layer. Further, a total thickness of the plurality of clad glass-ceramic layers is from about 0.05 mm to about 0.5 mm. In addition, each of the glass-ceramic layers includes: an alumino-boro-silicate glass, 0 mol %≤$MoO_3$≤15 mol %, and 0 mol %≤$WO_3$≤15 mol %, the $WO_3$ (mol %) plus the $MoO_3$ (mol %) is from 0.7 mol % to 19 mol %. Further, the laminate glass-ceramic article further comprises: (a) a total transmittance of less than or equal to 5% at ultraviolet (UV) wavelengths below 390 nm, (b) a total transmittance from about 1% to about 15% in the near infrared (NIR) spectrum from 700 nm to 1500 nm, and (c) a total transmittance of greater than or equal to about 70% in the visible spectrum from 400 nm to 700 nm.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
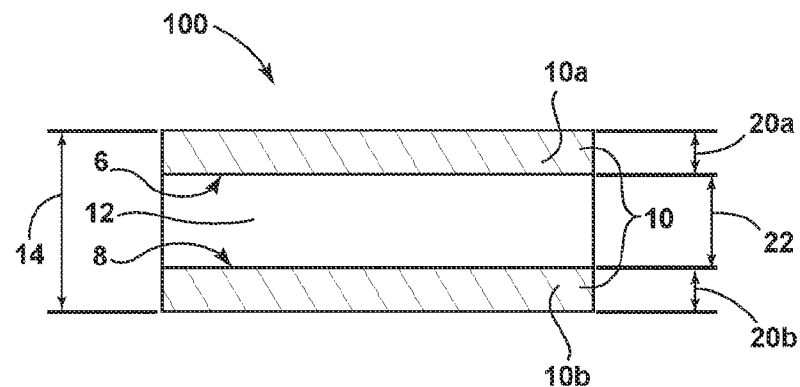
FIG. 1 is a cross-sectional view of a laminated glass-ceramic article comprising glass-ceramic clad layers, according to at least one example of the disclosure.

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As also used herein, the terms "glass article," "glass articles," "glass-ceramic article" and "glass-ceramic articles" are used in their broadest sense to include any object made wholly or partly of glass and/or glass-ceramics. Unless otherwise specified, all compositions are expressed in terms of mole percent (mol %). Coefficients of thermal expansion (CTE) are expressed in terms of $10^{-7}/°$ C. and represent a value measured over a temperature range from about 20° C. to about 300° C., unless otherwise specified.

The terms "relatively low CTE" and "low CTE" are used interchangeably in the disclosure with regard to clad glass layers with a starting glass composition (e.g., prior to drawing, laminating, and/or ion exchange) having a CTE that is lower than the CTE of the starting composition of the core glass by at least about $5×10^{-7}/°$ C. The CTE of clad glass layers may also be lower than the CTE of the core glass layer by an amount in the range from about $5×10^{-7}/°$ C. to about $70×10^{-7}/°$ C., from about $10×10^{-7}/°$ C. to about $60×10^{-7}/°$ C., or from about $10×10^{-7}/°$ C. to about $50×10^{-7}/°$ C. For example, the core glass may have a CTE of about $100×10^{-7}/°$ C. and the clad glass layers may have a CTE of about $50×10^{-7}/°$ C., such that there is a difference of about $50×10^{-7}/°$ C. between the CTE of the core glass and the clad glass layers.

The terms "thin glass" or "relatively thin glass" are used interchangeably in relation to laminated glass structures in the disclosure and intended to mean a laminated structure having a total thickness not exceeding about 3 mm.

The terms "mechanically strengthened glass laminate," "mechanically strengthened glass laminated structure" and "mechanical strengthening" are used in relation to the laminated glass structures of the disclosure to mean a glass laminate that has been formed by laminating a high CTE core glass to low CTE clad glass layer(s), thereby creating compressive stresses in the clad glass layers when the laminate is cooled following lamination. These compressive stresses can offset externally applied mechanical stresses, which have the net effect of strengthening the laminate.

The terms "chemically strengthened" and "chemical strengthening," as used in the present description, are intended to mean glass (e.g., a core glass layer, a clad glass layer, etc.) that has been strengthened using an ion exchange process, as understood by those with ordinary skill in the field of the disclosure, to create compressive stresses in the surface region of the glass at one or more of its primary surfaces and edges.

As used herein, "transmission", "transmittance", "optical transmittance" and "total transmittance" are used interchangeably in the disclosure and refer to external transmission or transmittance, which takes absorption, scattering and reflection into consideration. Fresnel reflection is not subtracted out of the transmission and transmittance values reported herein. In addition, any total transmittance values referenced over a particular wavelength range are given as an average of the total transmittance values measured over the specified wavelength range.

As used herein, "a glassy phase" refers to an inorganic material within the glass and glass-ceramic articles of the disclosure that is a product of fusion that has cooled to a rigid condition without crystallizing.

As used herein, "a crystalline phase" refers to an inorganic material within the glass and glass-ceramic articles of the disclosure that is a solid composed of atoms, ions or molecules arranged in a pattern that is periodic in three dimensions. Further, "a crystalline phase" as referenced in this disclosure, unless expressly noted otherwise, is determined to be present using the following method. First, powder x-ray diffraction ("XRD") is employed to detect the presence of crystalline precipitates. Second, Raman spectroscopy ("Raman") is employed to detect the presence of crystalline precipitates in the event that XRD is unsuccessful (e.g., due to size, quantity and/or chemistry of the precipitates). Optionally, transmission electron microscopy ("TEM") is employed to visually confirm or otherwise substantiate the determination of crystalline precipitates obtained through the XRD and/or Raman techniques.

As it relates to the glass-ceramic and glass-ceramic materials and articles of the disclosure, compressive stress and depth of compression ("DOC") are measured by evaluating surface stress using (a) commercially available instruments, such as the FSM 6000 manufactured by Orihara Co., Ltd. (Tokyo, Japan), or (b) the refracted near field ("RNF") technique, as understood by those with ordinary skill in the field of the disclosure, in which the parallel and perpendicular refractive indices are measured and the difference called the birefringence is divided by the stress optical coefficient ("SOC") to obtain stress. Surface stress measurements rely upon the accurate measurement of the SOC, which is related to the birefringence of the glass. SOC in turn is measured according to a modified version of Procedure C, which is described in ASTM standard C770-98 (2013) ("modified Procedure C"), entitled "Standard Test Method for Measurement of Glass Stress-Optical Coefficient," the contents of which is incorporated herein by reference in its entirety. The modified Procedure C includes using a glass or glass-ceramic disc as the specimen having a thickness of 5 to 10 mm and a diameter of 12.7 mm. The disc is isotropic and homogeneous, and is core-drilled with both faces polished and parallel. The modified Procedure C also includes calculating the maximum force, $F_{max}$, to be applied to the disc. The force should be sufficient to produce at least 20 MPa compression stress. $F_{max}$ is calculated using the equation:

$$F_{max}=7.854*D*h$$

where $F_{max}$ is the maximum force (N), D is the diameter of the disc (mm), and h is the thickness of the light path (mm). For each force applied, the stress is computed using the equation:

$$\sigma \text{ (MPa)}=8F/(\pi*D*h)$$

where F is the force (N), D is the diameter of the disc (mm), and h is the thickness of the light path (mm).

As detailed in this disclosure, laminate glass-ceramic articles with UV- and NIR-blocking attributes are provided. More particularly, the disclosure details laminate articles and patterned laminate articles that comprise tungsten oxide-doped, mixed molybdenum-tungsten oxide-doped, and molybdenum oxide-doped alumino-borosilicate compositions. In general, these laminate glass-ceramic articles comprise transparent, tungsten oxide-, mixed molybdenum-tungsten oxide-doped, and molybdenum oxide-containing clad glass-ceramic layers with a CTE that is lower than the CTE of the core glass layer. Other embodiments comprise clad glass layers and a core glass-ceramic layer comprising transparent, tungsten oxide-, mixed molybdenum-tungsten oxide-doped, and molybdenum oxide-containing composition having a CTE that is greater than the CTE of the clad glass layer. Further, the disclosure also relates to methods of making these articles.

Aspects of the laminate glass-ceramic articles of the disclosure can be employed in various applications requiring a high average transmittance (e.g., ≥70%) in the visible spectrum (VIS) with strong UV and IR attenuation, including but not limited to automotive windshields and architectural glazing. Other aspects of the laminate glass-ceramic articles of the disclosure can be employed in various applications requiring a low average transmittance (e.g., about 5 to 30%) in the visible spectrum (VIS) with strong UV and IR attenuation, including but not limited to automotive side lights, automotive sunroofs and privacy glazing. Further, the VIS and IR absorbance of these laminate glass-ceramic articles can be modulated by treatment in a gradient furnace or by local heating. Localized patterning can also be employed to selectively write logos or other patterns into these articles.

As the tungsten oxide-doped, mixed molybdenum-tungsten oxide-doped, and molybdenum oxide-doped alumino-borosilicate compositions employed in the clad or core of these laminates exhibit significantly higher absorption coefficients than conventional UV/IR-absorptive tint glasses, privacy glass and polychromatic glass, these compositions can achieve visible transmittance and UV/IR-blocking levels at reduced path lengths to facilitate lighter weight laminate glazing solutions, e.g., for windshields, sunroofs, and architectural glazing applications. Further, owing to their optical characteristics at reduced path lengths, these compositions can facilitate laminate glass-ceramic article configurations that do not require additional, costly optical coatings (e.g., low-E coatings). In addition, the laminate glass-ceramic articles of the disclosure are advantageous in the sense that they do not substantially block and/or do not block microwave signals. Still further, aspects of the laminate glass-ceramic articles of the disclosure allow for strengthening through clad/core layer CTE mismatch at levels that do not require additional ion exchange processing, which results in a relatively low cost, low weight laminate glass-ceramic article with high durability.

Referring again to the tungsten oxide-doped, mixed molybdenum-tungsten oxide-doped, and molybdenum oxide-doped alumino-borosilicate compositions employed in the clad or core of the laminate glass-ceramics of the disclosure, it should be noted that these compositions (in their current form) are not generally able to produce desirable high visible transmittance with strong UV and IR absorbance (e.g., for a windshield application) at conventional single ply fusion thicknesses (e.g., ~0.5 to 0.7 mm); rather, they can do so at a reduced path length (<0.5 mm), which is advantageous from a weight reduction standpoint when these materials are employed in laminate form (e.g., as clad glass-ceramic layers over a core glass layer). Without being bound by theory, it is postulated that the primary reason that these glass ceramic compositions generally do not achieve high average visible transmittance and sufficiently high IR absorbance at larger path lengths of 0.5-0.7 mm is the difference in the rate at which the crystal develops its VIS and IR absorbance. While the rates of VIS and IR absorbance as a function of heat treatment temperature have not been explicitly quantified, it has been observed that at the early stage of crystal growth, VIS absorbance increases relatively rapidly compared to IR absorbance. Later in the development of the crystals (e.g., at longer heat treatment times), the IR absorbance increases significantly until it reaches an absorbance that is more than one order of magnitude greater than the VIS absorbance. However, by that point in the heat treatment cycle, the VIS transmittance is far too low for windshield applications. Shortening the heat treatment time does not solve the problem either, because if the sample (assuming a ~0.5-0.7 mm thickness) is removed when the visible transmittance is in specification for a windshield (e.g., ≥70%), it has not developed sufficient IR absorbance to meet the IR-related aspect of the windshield specification. When considering the two factors that prevent these materials from producing high visible transmittance and strong UV/IR absorbance at conventional thicknesses for windshield (e.g., ~0.5-0.7 mm), it is clearly dominated by the rate of VIS to IR absorbance formation as the crystal grows. However, because the IR absorbance is 10× greater than the VIS absorbance, the unique optical properties of these glass-ceramic compositions can be leveraged by reducing their thickness (e.g., as in the form of clad or core glass-ceramic layers in a laminate) and produce a lightweight, all-glass/glass-ceramic light management solution for automotive windshields.

The laminate glass-ceramic articles of the disclosure offer several advantages over conventional glazing materials and configurations. Among these, the laminates of the disclosure are capable of providing strong UV and IR attenuation with either high or low visible transmittance (depending on the desired end use application). The laminate glass-ceramics offer these optical properties without the use of coatings or films at path lengths significantly shorter than conventional tinted glasses. Consequently, they facilitate robust and lightweight glass-ceramic laminate solutions for various window and glazing applications. These laminate glass-ceramic articles offer cost savings over coated, conventional tinted glass approaches. While the raw material costs can be higher for these laminates, these costs are more than offset by their relative simplicity in comparison to approaches that rely on additional coatings, such as low-E coatings, to achieve the required optical properties. As an additional advantage, the laminate glass-ceramic articles of the disclosure may be transparent to RF signals, unlike coated, conventional tinted glass configurations. Accordingly, the laminate glass-ceramic articles of the disclosure can provide a solution for next generation glazing applications, e.g., those that are compatible with current RF frequencies and 5G wireless. Another advantage of aspects of these laminate glass-ceramic articles is that their optical properties can be struck upon drawing, and may not require additional heat treatment process steps, which can aid in maintaining a low-cost configuration. Further, as embodiments of the laminate glass-ceramic articles of the disclosure are sensitive to heat treatment conditions, the articles can be subjected to localized heat treatments that result in patterning, bleaching and other localized design effects.

Referring now to FIG. 1, an exemplary, laminate glass-ceramic article 100 is provided according to an embodiment of the disclosure. As noted earlier, these laminate glass-ceramic articles can be employed in various window and window-related applications, e.g., automotive windshields, automotive sunroofs, architectural glazing, and others. The laminate article 100 includes a core glass layer 12 having a thickness 22 and a first coefficient of thermal expansion (CTE); and one or a plurality of clad glass-ceramic layers 10, each having a CTE that is lower than or equal to the first CTE of the core glass layer 12. A first of the clad layers 10a, having a thickness 20a, is laminated to a first surface 6 of the core glass layer 12. Additionally, or alternatively, a second of the clad layers 10b, having a thickness 20b, is laminated to a second surface 8 of the core glass layer 12. Further, the total thickness 14 of the core glass layer 12 and the clad glass-ceramic layers 10 ranges from about 0.1 mm to about 3 mm. In embodiments of the laminate glass-ceramic article 100 depicted in FIG. 1, the clad glass-ceramic layers 10 and the core glass layer 12 may have a selected length and width, or diameter, to define their surface area. For example, the core glass layer 12 may have at least one edge between the primary surfaces 6, 8, as defined by its length and width, or diameter.

In some embodiments of the laminate glass-ceramic article 100 (see FIG. 1), the total thickness 14 is from about 0.1 mm to about 6 mm, from about 0.1 mm to about 5 mm, from about 0.1 mm to about 4 mm, or from about 0.1 mm to about 3 mm. In some implementations, the total thickness 14 of the laminate glass-ceramic article 100 does not exceed about 3 mm, or about 2.5 mm. Further, in some aspects, the total thickness 14 ranges from about 0.1 mm to about 3.0 mm, from about 0.15 mm to about 3 mm, from about 0.3 mm to about 3 mm, from about 0.1 mm to about 1 mm, from about 0.15 mm to about 2.5 mm, from about 0.3 mm to about 2.5 mm, or all thickness values between these values.

Referring again to the laminate glass-ceramic article 100 depicted in FIG. 1, the thickness 22 of the core glass layer 12 can range from about 0.1 mm to about 5 mm, from about 0.1 mm to about 4 mm, from about 0.1 mm to about 3 mm, from about 0.1 mm to about 2.5 mm, from about 0.1 mm to about 2 mm, from about 0.1 mm to about 1 mm, from about 0.2 mm to about 5 mm, from about 0.2 mm to about 4 mm, from about 0.2 mm to about 3 mm, from about 0.2 mm to about 2.9 mm, from about 0.2 mm to about 2.8 mm, from about 0.2 mm to about 2.7 mm, from about 0.2 mm to about 2.6 mm, from about 0.2 mm to about 2.5 mm, from about 0.2 mm to about 2 mm, from about 0.3 mm to about 5 mm, from about 0.3 mm to about 2.5 mm, from about 0.3 mm to about 2 mm, and all values between these levels.

Still referring to the laminate glass-ceramic article 100 depicted in FIG. 1, the thicknesses 20a, 20b of the clad glass-ceramic layers 10a, 10b can each range from about 0.01 mm to about 5 mm, from about 0.01 mm to about 4 mm, from about 0.01 mm to about 3 mm, from about 0.01 mm to about 2.5 mm, from about 0.01 mm to about 2 mm, from about 0.05 mm to about 3 mm, from about 0.05 mm to about 2.5 mm, from about 0.05 mm to about 2.0 mm, from about 0.05 mm to about 1.5 mm, from about 0.05 mm to about 1 mm, from about 0.05 mm to about 0.5 mm, from about 0.05 mm to about 0.4 mm, from about 0.05 mm to about 0.3 mm, from about 0.05 mm to about 0.2 mm, from about 0.05 mm to about 0.1 mm, from about 0.1 mm to about 3 mm, from about 0.1 mm to about 2.5 mm, from about 0.1 mm to about 2 mm, from about 0.2 mm to about 3 mm, from about 0.2 mm to about 2.5 mm, from about 0.2 mm to about 2 mm, from about 0.3 mm to about 3 mm, from about 0.3 mm to about 2.5 mm, from about 0.3 mm to about 2 mm, and all values between these levels.

According to some aspects of the disclosure, the laminate glass-ceramic article 100 depicted in FIG. 1 can include a relatively high CTE core glass layer 12 and a relatively low CTE clad glass-ceramic layer 10 laminated to each of the primary surfaces 6, 8 of the core glass layer 12. These relatively low CTE clad glass-ceramic layers 10 can be laminated to the relatively high CTE core glass layer 12 by bonding the surfaces of the layers together at elevated temperatures such that the clad glass-ceramic layers 10 are fused to the core glass layer 12. The laminate glass-ceramic article 100 is then allowed to cool. As the laminate glass-ceramic article 100 cools, the relatively high CTE core glass layer 12 contracts more than the relatively low CTE clad glass-ceramic layers 10 that are securely bonded to the surfaces of the core glass layer 12. Due to the variable contraction of the core glass layer 12 and the clad glass-ceramic layers 10 during cooling, the core glass layer 12 is placed in a state of tension (or tensile stress) and the clad glass-ceramic layers 10 are placed in a state of compression (or compressive stress). This results in a mechanically strengthened, laminate glass-ceramic article 100 having a stress profile in which the compressive stress extends entirely through the clad glass-ceramic layers 10. An advantageous, very deep depth of the compressive stress region (e.g., a depth-of-layer, "DOL") is thus formed in the laminate glass-ceramic article 100. Compressive stresses ("CS") at the surface of the clad glass-ceramic layers 10 can range from about 20 MPa to about 400 MPa, or from about 50 MPa to about 700 MPa, and other values between these ranges, as the result of mechanical strengthening.

According to embodiments of the laminate glass-ceramic article 100 (see FIG. 1), the plurality of clad glass-ceramic layers 10 (i.e., one or more of the clad glass-ceramic layers 10a, 10b) can be configured with a compressive stress region generated from an ion-exchange process; and can also be configured with an ion-exchangeable glass composition (e.g., a glass composition with one or more alkali metal ions, some of which may be exchanged with other alkali metal ions to develop residual compressive stresses). That is, the clad glass-ceramic layers 10, before or after lamination with the core glass layer 12, can be configured with a compressive stress region to chemically strengthen the laminate glass-ceramic article 100 by virtue of the development of compressive stress in surface regions of the clad glass-ceramic layers 10. More particularly, a compressive stress region is developed in the plurality of clad glass-ceramic layers 10 such that compressive stress is present at the surface of the clad glass-ceramic layers 10 and through a portion of the clad glass-ceramic layers 10 to a particular depth. It should also be understood that the compressive stresses developed through chemical strengthening (e.g., an ion-exchange process) can be in addition to existing residual compressive stresses possessed by the clad glass-ceramic layers 10 from mechanical strengthening (e.g., via CTE mismatch between the plurality of clad glass-ceramic layers 10 and the core glass layer 12). Accordingly, the compressive stress created at the outer surfaces and near surface regions of the plurality of clad glass-ceramic layers 10 can be comparable to or greater than what can otherwise be achieved by a chemical strengthening process alone and compressive stresses from 500 to 1000 MPa can be readily achieved.

Referring again to the laminate glass-ceramic articles 100 depicted in FIG. 1 with ion-exchanged developed compressive stress regions, the compressive stress region can extend from the outermost surfaces of the clad glass-ceramic layers 10 to a first selected depth. As used herein, a "selected depth", "depth of compression", and "DOC" are used interchangeably to define the depth at which the stress in the clad glass-ceramic layers 10, as described herein, changes from compressive to tensile. DOC may be measured by a surface stress meter, such as an FSM-6000, or a scattered light polariscope (SCALP) depending on the ion exchange treatment. Where the stress in these layers 10 having a glass-ceramic composition is generated by exchanging potassium ions into the glass-ceramic substrate, a surface stress meter is used to measure DOC. Where the stress is generated by exchanging sodium ions into the glass article, SCALP is used to measure DOC. Where the stress in the glass-ceramic layer 10 is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by a surface stress meter. To the extent that the above SCALP approaches are unsuccessful in measuring DOC and stress levels in these articles 100, the RNF approach outlined earlier may also be employed to determine these attributes. As also used herein, the "maximum compressive stress" is defined as the maximum compressive stress within the compressive stress region in the clad glass-ceramic layers 10. In some embodiments, the maximum compressive stress is obtained at or in close proximity to the one or more primary surfaces (opposite from the primary surfaces 6, 8 of the core glass layer 12) defining the compressive stress region. In other embodiments, the maximum compressive stress is obtained between the one or more primary surfaces and the selected depth of the compressive stress region in these clad glass-ceramic layers 10.

In some embodiments, as depicted in exemplary form in FIG. 1, the article 100 may also include one or more compressive stress regions within the glass-ceramic layers 10 that extend from one or more of the primary surfaces to a selected depth (or depths) having a maximum compressive stress of greater than about 150 MPa, greater than 200 MPa, greater than 250 MPa, greater than 300 MPa, greater than 350 MPa, greater than 400 MPa, greater than 450 MPa, greater than 500 MPa, greater than 550 MPa, greater than 600 MPa, greater than 650 MPa, greater than 700 MPa, greater than 750 MPa, greater than 800 MPa, greater than 850 MPa, greater than 900 MPa, greater than 950 MPa, greater than 1000 MPa, and all maximum compressive stress levels between these values. In some embodiments, the maximum compressive stress is 2000 MPa or lower. In addition, the depth of compression (DOC) or first selected depth can be set at 10 μm or greater, 15 μm or greater, 20 μm or greater, 25 μm or greater, 30 μm or greater, 35 μm or greater, and to even higher depths, depending on the thickness of the clad glass-ceramic layers 10 and the processing conditions associated with generating the compressive stress region. In some embodiments, the DOC is less than or equal to 0.3 times the thicknesses (t) 20a, 20b of each the clad glass-ceramic layers 10a, 10b, for example 0.3 t, 0.28 t, 0.26 t, 0.25 t, 0.24 t, 0.23 t, 0.22 t, 0.21 t, 0.20 t, 0.19 t, 0.18 t, 0.15 t, or 0.1 t.

In some implementations, the laminate glass-ceramic article 100 (see FIG. 1) is formed with compressive stresses from both a mechanical strengthening process (e.g., via CTE mismatch of the core and clad glass layers) and a chemical strengthening process (e.g., via an ion-exchange process), resulting in a deep compressive stress region. The resulting laminate glass-ceramic article 100 has a higher combined compressive stress (CS) and/or depth of compressive stress layer (DOL) than the CS and/or DOL levels that can be achieved using either mechanical or chemical strengthening processes alone. In some embodiments, the laminate glass-ceramic article 100 is subjected to mechanical strengthening through CTE mismatch of the core glass and clad glass-ceramic layers 12, 10 such that each of the plurality of clad glass-ceramic layers 10 has compressive stress (CS) at its outer surfaces of over 50 MPa, over 250 MPa, in a range from about 50 MPa to about 400 MPa, from about 50 MPa to about 300 MPa, from about 250 MPa to about 600 MPa, or from about 100 MPa to about 300 MPa. Further, in some embodiments, the laminate glass-ceramic article 100 is subjected to a chemical strengthening from an ion exchange process such that each of the plurality of clad glass-ceramic layers 10 has a compressive stress region with a CS of 200 MPa or greater, 300 MPa or greater, 400 MPa or greater, 500 MPa or greater, 600 MPa or greater, 700 MPa or greater, 800 MPa or greater, 900 MPa or greater, a range from 200 MPa to about 1000 MPa, or from about 200 MPa to about 800 MPa. In embodiments of the laminate glass-ceramic article 100 subjected to both mechanical and chemical strengthening, each of the plurality of clad glass-ceramic layers 10 can have a compressive stress (CS) at its outer surfaces as high as 700 MPa to 1000 MPa (e.g., about 300 MPa from mechanical strengthening and about 700 MPa from chemical strengthening).

Referring again to FIG. 1, the core glass layer 12 of the laminate glass-ceramic article 100 can be configured with a glass composition such that it has a CTE that is the same or higher than the CTE of each of the plurality of clad glass-ceramic layers 10. For example, the core glass layer 12 can be formed from a glass composition which includes: from about 70 mol % to about 80 mol % $SiO_2$; from about 0 mol % to about 8 mol % $Al_2O_3$; from about 3 mol % to about 10 mol % $B_2O_3$; from about 0 mol % to about 2 mol % $Na_2O$; from about 10 mol % to about 15 mol % $K_2O$; and from about 5 mol % to about 6 mol % of alkaline earth oxide, wherein the alkaline earth oxide is at least one of MgO, SrO, and BaO without containing more than 0.5% CaO. It should also be understood that other glass compositions may also be used to form the core glass layer of the laminate article, provided that the average CTE of the core glass layer 12 is greater than or equal to the average CTE of each of the substrates 10 serving as the clad. Embodiments of the resulting laminate glass-ceramic article 100 are capable of providing strong UV- and IR-attenuation with low visible transmittance without the use of coatings or films at path lengths that are significantly shorter than conventional absorptive tinted glasses (e.g., Saint-Gobain Corporation Thermocontrol Venus® VG10 Deep Grey Tinted Glass ("VG10") and PPG Industries, Inc. GL20 privacy glass ("GL20")). Other embodiments of the resulting laminate glass-ceramic article 100 are capable of providing strong UV- and IR-attenuation with relatively high visible transmittance levels (e.g., 2.13 mm thick substrates fabricated from PPG Industries, Inc. Solargreen C5 and C3.9 glass). Further, embodiments of these laminate glass-ceramic articles 100 are transparent to RF signals, unlike substrates with conventional glazing compositions that employ IR-reflective coatings to achieve IR shielding requirements. As such, these laminates are believed to be compatible with current RF frequencies and 5G wireless requirements. It should also be understood that other glass compositions may also be used to form the core glass layer 12 of the laminate glass-ceramic article 100, provided that the average CTE of the core glass layer 12 is greater than or equal to the average CTE of each of the plurality of clad glass-ceramic layers 10 (e.g., a CTE that is greater than the typical range of clad glass-ceramic layers, $33\text{-}65 \times 10^{-7}/°$ C.).

Referring again to FIG. 1, each of the plurality of clad glass-ceramic layers 10 (e.g., clad glass-ceramic layers 10a, 10b) of the laminate glass-ceramic article 100 can be configured with a glass-ceramic composition such that each has a CTE that is the same as or lower than the CTE of the core glass layer 12. According to embodiments, the clad glass-ceramic layers 10 have a CTE in a range from $33\text{-}65 \times 10^{-7}/°$ C. In general, each of the clad glass-ceramic layers 10a, 10b and/or the plurality of clad glass-ceramic layers 10 can be formed from a composition which includes: tungsten oxide-doped, mixed molybdenum-tungsten oxide-doped, and molybdenum oxide-doped alumino-borosilicate compositions. In some embodiments of the tungsten oxide-doped compositions employed in the clad glass-ceramic layers 10, vanadium oxide can also be added as a dopant.

According to some embodiments of the disclosure, the laminate glass-ceramic article 100 depicted in FIG. 1 can comprise a thickness 14 that ranges from about 0.25 mm to about 3 mm and a total transmittance from about 1% to about 30% in the visible spectrum from 400 nm to 700 nm. Further, in some implementations, the total transmittance can vary from about 1% to about 30%, from about 1% to about 25%, from about 1% to about 20%, from about 1% to about 15%, from about 1% to about 10%, and all values between these transmittance levels, in the visible spectrum from 400 nm to 700 nm. According to other embodiments of the disclosure, the laminate glass-ceramic article 100 depicted in FIG. 1 can comprise a thickness 14 that ranges from about 0.25 mm to about 3 mm and a total transmittance of greater than or equal to about 70% in the visible spectrum from 400 nm to 700 nm. Further, in some implementations, the total transmittance can vary from about 70% to about 95%, from about 70% to about 90%, from about 70% to about 85%, from about 70% to about 80%, and all values between these transmittance levels, in the visible spectrum from 400 nm to 700 nm.

At these same thickness ranges, the laminate glass-ceramic article 100 depicted in FIG. 1 can also exhibit UV and IR-shielding. For example, the laminate article 100 can exhibit a total transmittance from about 1% to about 15% in the near infrared (NIR) spectrum from 700 nm to 1500 nm. In some implementations, the total transmittance can vary from about 1% to about 20%, from about 1% to about 15%, from about 1% to about 10%, from about 5% to about 20%, from about 5% to about 15%, from about 5% to about 12.5%, from about 5% to about 10%, from about 5% to about 7.5%, and all values between these transmittance levels, in the NIR spectrum. In addition, the laminate article 100 can comprise a total transmittance of less than or equal to 5% at UV wavelengths below 390 nm. In implementations, the total transmittance can be less than or equal to 5%, less than or equal to 4%, less than or equal to 3%, less than or equal to 2%, less than or equal to 1%, and all other values within these ranges, at UV wavelengths below, or less than or equal to, 390 nm.

Referring again to FIG. 1, the clad glass-ceramic layers 10 of the laminate article 100 can be characterized by a glass-ceramic composition. In embodiments, the glass-ceramic composition of the clad glass-ceramic layers 10 is given by: $MoO_3$ from 0 mol % to about 15 mol %; $WO_3$ from 0 mol % to 10 mol %; optionally, at least one alkali metal oxide from 0 to 15 mol %; and a balance of a silicate-containing glass. As such, these glass-ceramic compositions can be classified as tungsten oxide-doped, mixed tungsten and molybdenum-doped and molybdenum-doped compositions. In other embodiments, the glass-ceramic composition of the clad glass-ceramic layers 10 is given by: $MoO_3$ from 0 mol % to about 15 mol %; $WO_3$ from 0.1 mol % to 10 mol %; $V_2O_5$ from 0.01 mol % to 0.2 mol %; optionally, at least one alkali metal oxide from 0 to 15 mol %; and a balance of a silicate-containing glass. These silicate-containing glasses include alumino-boro-silicate glass, boro-silicate glass, alumino-silicate glass, soda-lime glass, and chemically-strengthened versions of these silicate-containing glasses.

As outlined earlier, the glass-ceramic materials of the disclosure, including as employed in the clad glass-ceramic layers 10 of the laminate glass-ceramic article 100 (see FIG. 1), can be characterized by the following glass-ceramic composition: 40 mol %≤$SiO_2$≤80 mol %; 1 mol %≤$Al_2O_3$≤15 mol %; 3 mol %≤$B_2O_3$≤50 mol %; 0 mol %≤$R_2O$≤15 mol %, $R_2O$ is one or more of $Li_2O$, $Na_2O$, $K_2O$ and $Cs_2O$; 0 mol %≤RO≤2 mol %, RO is one or more of MgO, CaO, SrO and BaO; 0 mol %≤$P_2O_5$≤3 mol %; 0 mol %≤$SnO_2$≤0.5 mol %; 0 mol %≤$MoO_3$≤15 mol %; and 0 mol %≤$WO_3$≤10 mol %, wherein the $WO_3$ (mol %) plus the $MoO_3$ (mol %) is from 1 mol % to 19 mol %, and wherein $R_2O$ (mol %) minus the $Al_2O_3$ (mol %) is from −12 mol % to 4 mol %.

In implementations, the glass-ceramic materials of the disclosure, including the clad glass-ceramic layers 10 employed in the laminate glass-ceramic article 100 (see FIG. 1), can comprise $SiO_2$ from about 40 mol % to about 80 mol %. According to some embodiments, the glass-ceramic materials can comprise $SiO_2$ from about 50 mol % to about 75 mol %. In another implementation, the glass-ceramic materials can comprise $SiO_2$ from about 60 mol % to about 72 mol %. Accordingly, the glass-ceramic materials of the disclosure can comprise $SiO_2$ from about 40 mol % to about 80 mol %, from about 40 mol % to about 75 mol %, from about 40 mol % to about 70 mol %, from about 40 mol % to about 65 mol %, from about 40 mol % to about 60 mol %, from about 40 mol % to about 55 mol %, from about 40 mol % to about 50 mol %, from about 50 mol % to about 80 mol %, from about 50 mol % to about 75 mol %, from about 50 mol % to about 70 mol %, from about 50 mol % to about 65 mol %, from about 50 mol % to about 60 mol %, from about 60 mol % to about 80 mol %, from about 60 mol % to about 75 mol %, from about 60 mol % to about 70 mol %, and all $SiO_2$ amounts between these range endpoints.

In implementations, the glass-ceramic materials of the disclosure, including the clad glass-ceramic layers 10 employed in the laminate glass-ceramic article 100 (see FIG. 1), can comprise $Al_2O_3$ from about 1 mol % to about 20 mol %. According to some embodiments, the glass-ceramic materials can comprise $Al_2O_3$ from about 5 mol % to about 20 mol %. In another implementation, the glass-ceramic materials can comprise $Al_2O_3$ from about 7 mol % to about 15 mol %. Accordingly, the glass-ceramic materials of the disclosure can comprise $Al_2O_3$ from about 1 mol % to about 20 mol %, from about 7 mol % to about 20 mol %, from about 1 mol % to about 15 mol %, from about 1 mol % to about 13 mol %, from about 1 mol % to about 12 mol %, from about 1 mol % to about 11 mol %, from about 1 mol % to about 10 mol %, from about 1 mol % to about 9 mol %, from about 1 mol % to about 8 mol %, from about 1 mol % to about 7 mol %, from about 1 mol % to about 6 mol %, from about 1 mol % to about 5 mol %, from about 5 mol % to about 15 mol %, from about 5 mol % to about 14 mol %, from about 5 mol % to about 13 mol %, from about 5 mol % to about 12 mol %, from about 5 mol % to about 11 mol %, from about 5 mol % to about 10 mol %, from about 7 mol % to about 15 mol %, from about 7 mol % to about 14 mol %, from about 7 mol % to about 13 mol %, from about 7 mol % to about 12 mol %, from about 7 mol % to about 11 mol %, from about 7 mol % to about 10 mol %, and all $Al_2O_3$ amounts between these range endpoints.

According to implementations, the glass-ceramic materials of the disclosure, including the clad glass-ceramic layers 10 employed in the laminate glass-ceramic article 100 (see FIG. 1), can comprise $B_2O_3$ from about 3 mol % to about 50 mol %. According to some embodiments, the glass-ceramic materials can comprise $B_2O_3$ from about 5 mol % to about 25 mol %. In another implementation, the glass-ceramic materials can comprise $B_2O_3$ from about 8 mol % to about 20 mol %. Accordingly, the glass-ceramic materials of the disclosure can comprise $B_2O_3$ from about 3 mol % to about 50 mol %, from about 3 mol % to about 45 mol %, from about 3 mol % to about 40 mol %, from about 3 mol % to about 35 mol %, from about 3 mol % to about 30 mol %, from about 3 mol % to about 25 mol %, from about 3 mol % to about 20 mol %, from about 3 mol % to about 15 mol %, from about 3 mol % to about 10 mol %, from about 5 mol % to about 50 mol %, from about 5 mol % to about 45 mol %, from about 5 mol % to about 40 mol %, from about 5 mol % to about 35 mol %, from about 5 mol % to about 30 mol %, from about 5 mol % to about 25 mol %, from about 5 mol % to about 20 mol %, from about 5 mol % to about 15 mol %, from about 5 mol % to about 10 mol %, from about 8 mol % to about 50 mol %, from about 8 mol % to about 45 mol %, from about 8 mol % to about 40 mol %, from about 8 mol % to about 35 mol %, from about 8 mol % to about 30 mol %, from about 8 mol % to about 25 mol %, from about 8 mol % to about 20 mol %, from about 8 mol % to about 15 mol %, and all $B_2O_3$ amounts between these range endpoints.

In further implementations, the glass-ceramic materials of the disclosure, including the clad glass-ceramic layers 10 employed in the laminate glass-ceramic article 100 (see FIG. 1), can comprise an alkali metal oxide ($R_2O$) from about 0 mol % to about 15 mol %, from about 2 mol % to about 14 mol %, from about 3 mol % to about 13 mol %, and all values of $R_2O$ between these values, $R_2O$ being one or more of $Li_2O$, $Na_2O$, $K_2O$ and $Cs_2O$. In addition, implementations of the glass-ceramic materials of the disclosure are configured such that the $R_2O$ (mol %) present minus the $Al_2O_3$ present (mol %) is from about −12 mol % to about 4 mol %, from about −12 mol % to about 3.8 mol %, from about −12 mol % to about 3.5 mol %, from about −10 mol % to about 3 mol %, from −8 mol % to about 1.5 mol %, and all values between these range endpoints.

According to other implementations, the glass-ceramic materials of the disclosure, including the clad glass-ceramic layers 10 employed in the laminate glass-ceramic article 100 (see FIG. 1), can comprise an alkaline earth metal oxide (RO) from 0 mol % to about 2 mol %, from 0 mol % to about 1 mol %, from about 0.01 mol % to about 2 mol %, from about 0.01 mol % to about 0.5 mol %, and all values of RO between these values, RO (assuming it is present) being one or more of MgO, CaO, SrO and BaO.

In other implementations, the glass-ceramic materials of the disclosure, including the clad glass-ceramic layers 10 employed in the article 100 (see FIG. 1), can comprise $P_2O_5$ from about 0 mol % to about 3 mol %, from about 0 mol % to about 2 mol %, from about 0 mol % to about 1.5 mol %, and all values of $P_2O_5$ between these values. In further implementations, the glass-ceramic materials of the disclosure, including the clad glass-ceramic layers 10 employed in the article 100 (see FIG. 1), can comprise $SnO_2$ from 0 mol % to about 0.5 mol %, from about 0 mol % to about 0.45 mol %, from 0 mol % to about 0.4 mol %, from about 0 mol % to about 0.35 mol %, from 0 mol % to about 0.3 mol %, from about 0 mol % to about 0.25 mol %, from 0 mol % to about 0.2 mol %, from about 0 mol % to about 0.15 mol %, from 0 mol % to about 0.1 mol %, from about 0 mol % to about 0.05 mol %, from about 0.05 mol % to about 0.5 mol %, from about 0.1 mol % to about 0.5 mol %, and all values of $SnO_2$ between these values. Further, in some implementations, the glass-ceramic materials of the disclosure, including the clad glass-ceramic layers 10 employed in the article 100 (see FIG. 1), can comprise $ZnO_2$ from about 0 mol % to about 5 mol %, from about 0 mol % to about 4.5 mol %, from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, and all values of $ZnO_2$ between these values.

The glass-ceramic materials of the disclosure include $MoO_3$ from about 0 mol % (i.e., trace amounts or less) to about 15 mol %, from about 0.1 mol % to about 15 mol %, from about 0.1 mol % to about 7 mol %, from about 0.1 mol % to about 4.1 mol %, from about 3 mol % to about 10 mol %, and all values between these ranges. Accordingly, implementations of the glass-ceramic materials of the disclosure can include $MoO_3$ from about 0.1 mol % to about 15 mol %, from about 0.1 mol % to about 14 mol %, from about 0.1 mol % to about 13 mol %, from about 0.1 mol % to about 12 mol %, from about 0.1 mol % to about 11 mol %, from about 0.1 mol % to about 10 mol %, from about 0.1 mol % to about 9 mol %, from about 0.1 mol % to about 8 mol %, from about 0.1 mol % to about 7 mol %, from about 0.1 mol % to about 6 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all values of $MoO_3$ between these range endpoints.

In some embodiments, the glass-ceramic materials include from about 0 mol % (i.e., trace amounts or less) to about 15 mol % $WO_3$, from about 0 mol % to about 10 mol $WO_3$, from about 0 mol % to about 7 mol % $WO_3$, from about 0 mol % to about 4 mol % $WO_3$, from about 0 mol % to about 3 mol % $WO_3$, from about 0 mol % to about 2 mol % $WO_3$, from about 0.1 mol % to about 7 mol % $WO_3$, from about 0.7 mol % to about 15 mol % $WO_3$, and all values between these endpoint ranges. Hence, $WO_3$ is optional in some embodiments, and in other embodiments can be present at trace amounts. In further implementations, the amount of $MoO_3$ and $WO_3$ is balanced such that $WO_3$ (mol %) plus the $MoO_3$ (mol %) is from about 0.7 mol % to about 19 mol %, from about 0.7 mol % to about 15 mol %, from about 1 mol % to about 19 mol %, from about 2 mol % to about 10 mol %, from about 3 mol % to about 6 mol %, and all values between these range endpoints.

In some embodiments, the glass-ceramic materials of the disclosure are substantially cadmium and substantially selenium free. In embodiments, the glass-ceramic can further comprise at least one dopant selected from the group consisting of H, S, Cl, Ti, V, Cr, Mn, Fe, Co, Ni, Cu, Ga, Se, Br, Zr, Nb, Ru, Rh, Pd, Ag, Cd, In, Sb, Te, I, La, Ce, Pr, Nd, Sm, Eu, Gd, Tb, Dy, Ho, Er, Tm, Yb, Lu, Ta, Os, Ir, Pt, Au, T, Pb, Bi, and U. In some embodiments, the at least one dopant is present in the glass-ceramic from about 0 mol % to about 0.5 mol %.

In other implementations, the glass-ceramic materials of the disclosure, including the clad glass-ceramic layers 10 employed in the laminate glass-ceramic article 100 (see FIG. 1), can comprise a fluorine (F) dopant from about 0 mol % to about 10 mol %, from about 0 mol % to about 7.5 mol %, from about 0 mol % to about 5 mol %, from about 0 mol % to about 2.5 mol %, and all concentrations of F between these values. In some embodiments, the addition of fluorine as a dopant can soften a melt of a glass-ceramic of the disclosure, thus reducing its melting temperature, annealing temperature and/or heat treatment temperature. In other implementations, the glass-ceramic materials of the disclosure, including the clad glass-ceramic layers 10, can comprise fluorine as a dopant in excess of 10 mol %. Further, the addition of fluorine as a dopant can increase the opacity of the resulting glass-ceramic article, particularly for fluorine additions in excess of 10 mol %.

According to further embodiments of the disclosure, glass-ceramic materials, including the clad glass-ceramic layers 10 employed in the article 100 depicted in FIG. 1, can comprise a glassy phase and at least one crystalline phase selected from the group consisting of a stoichiometric crystalline phase, a non-stoichiometric crystalline phase and a mixed stoichiometric and non-stoichiometric crystalline phase. Further, these glass-ceramic materials have crystalline phases that typically have dimensions on a nanoscale level and can be characterized as non-stoichiometric molybdenum and/or mixed molybdenum-tungsten oxides (also referred herein as "bronzes"). Though called a "bronze," the molybdenum and mixed molybdenum-tungsten bronzes are not structurally or chemically related to metallic bronze, which is an alloy of copper and tin. Rather, the term "bronze," as it relates to the molybdenum and mixed molybdenum-tungsten bronzes of the disclosure, was originally associated with the larger family of these materials, which includes sodium tungsten bronze which at a certain stoichiometric range is characterized by a brilliant, lustrous yellow color similar in hue to metallic bronzes.

In some implementations of the foregoing glass-ceramic materials of the disclosure, the crystalline phase can comprise a crystalline phase of $M_xWO_3$ and/or $M_yMoO_3$, wherein M is at least one of H, Li, Na, K, Rb, Cs, Mg, Ca, Sr, Sn, P, S, Ti, V, Cr, Mn, Fe, Co, Ni, Cu, Ga, Se, Zr, Nb, Ru, Rh, Pd, Ag, Cd, In, Sb, Te, La, Ce, Pr, Nd, Sm, Eu, Gd, Tb, Dy, Ho, Er, Tm, Yb, Lu, Ta, Os, Ir, Pt, Au, T, Pb, Bi, and/or U, and wherein $0 \leq x \leq 1$ and $0 \leq y \leq 1$. Further, the glass-ceramic can comprise ternary metal oxides of the general formula $M'_xM''_yO_z$, where M" is a transition metal or a combination of transition metals, M' is a metal or a combination of metals that differ from M", $2 \leq z \leq 5$, and x and y are based on z and the valence of M' and M". Depending on the concentration and choice of M', the material properties can range from metallic to semi-conducting, and exhibit tunable optical absorption. The structure of these bronzes is a solid state defect structure in which M' cations intercalate into holes or channels of the binary oxide host ($M''_yO_z$) and disassociate into $M^+$ cations and free electrons. In turn, as x is varied, these materials can exist as a broad sequence of solid phases, with varying levels of heterogeneity.

Figure 2:
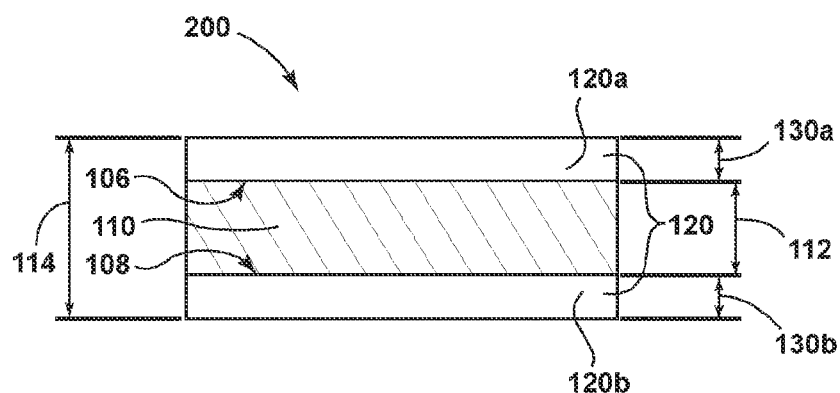
FIG. 2 is a cross-sectional view of a laminated glass-ceramic article comprising a glass-ceramic core layer, according to at least one example of the disclosure.

According to another aspect of the disclosure, a laminate glass-ceramic article 200 is depicted in FIG. 2 that includes: a core glass-ceramic layer 110 having a first coefficient of thermal expansion (CTE) and a thickness 112; and one or a plurality of clad glass layers 120, each having a CTE that is lower than or equal to the first CTE of the core glass-ceramic layer 110. A first layer of the clad glass layers 120a is laminated to a first surface 106 of core glass-ceramic layer 110 and a second layer of the clad glass layers 120b is laminated to a second surface 108 of the core glass-ceramic layer 110. Further, a total thickness 130a, 130b of the plurality of clad glass layers 120 is from about 0.05 mm to about 0.2 mm. In addition, the total thickness 114 of the laminate glass-ceramic article 200 can range from about 0.1 mm to about 3 mm. Further, the thickness of the core glass-ceramic layer can range from about 0.01 mm to about 3 mm.

Referring again to the laminate glass-ceramic article 200 depicted in FIG. 2, the core glass-ceramic layer 110 includes: an alumino-boro-silicate glass, 0 mol %$\leq MoO_3 \leq$15 mol %, and 0 mol %$\leq WO_3 \leq$15 mol %, the $WO_3$ (mol %) plus the $MoO_3$ (mol %) is from 1 mol % to 19 mol %. As such, the composition of the core glass-ceramic layer 110 of the laminate glass-ceramic article 200 is comparable to the composition of the clad glass-ceramic layers 10 of the laminate glass-ceramic article 100 (see FIG. 1). Similarly, the composition of the clad glass layers 120 of the laminate glass-ceramic article 200 is comparable to the composition of the core glass layer 12 of the laminate glass-ceramic article 100. In view of these configurations and layer compositions, the laminate glass-ceramic article 200 represents a configuration in which the IR and UV-absorbing aspect is within the core of the laminate article.

According to some embodiments of the laminate glass-ceramic article 200, the clad glass layers 120 offer the same or better chemical durability than the core glass-ceramic layer 110. Accordingly, the laminate glass-ceramic article 200 could be employed in glazing applications requiring strong UV, VIS and IR absorbance and high chemical durability. More particularly, the core glass-ceramic layer 110, which may be more susceptible to chemical attack as compared to the clad glass layers 120, is protected by these clad glass layers 120. This is an important feature of these embodiments of article 200 because the core glass-ceramic layer 110 can include oxidation state-sensitive species, such as alkali tungsten bronzes, which may be susceptible to environmental impact and potential chemical attack.

Non-limiting compositions of glass-ceramics according to the principles of the disclosure are listed below in Tables 1A-1D (reported in mol %). As noted earlier, these compositions can be employed in clad glass-ceramic layers 10 in laminate glass-ceramic articles 100 (see FIG. 1). As outlined further below, these compositions can also be employed in a core glass-ceramic layer 110 in a laminate glass-ceramic article 200 (see FIG. 2 and corresponding description). Table 1A lists glass-ceramic compositions with $WO_3$ content and no $MoO_3$. Table 1B lists glass-ceramic compositions with mixed amounts of $MoO_3$ and $WO_3$. Table 1C lists glass-ceramic compositions with $MoO_3$ content and no $WO_3$. Table 1D lists glass-ceramic compositions with mixed amounts of $WO_3$ and $V_2O_5$.

Table 1A below lists various fusion compatible tungsten-containing glass-ceramic compositions (Exs. 1-10). In particular, each of these glass-ceramic compositions includes $WO_3$ and trace amounts or less of $MoO_3$, among other constituents. According to implementations of the disclosure, these compositions are suitable for laminate glass-ceramic articles for applications requiring IR and UV attenuation, along with either high or low VIS transmittance levels. In two exemplary implementations, the Ex. 1 and Ex. 2 glass-ceramic compositions are particularly suited for fusion-compatible, UV- and IR-absorbing applications (e.g., automotive windshields) with relatively high VIS transmittance. Further, the Exs. 3-7 glass-ceramic compositions are particularly suited for fusion-compatible, UV- and IR-absorbing applications (e.g., automotive glazing, such as sunroofs) with relatively low VIS transmittance.

TABLE 1A

Glass-ceramic compositions with $WO_3$ and no $MoO_3$ (mol %)

|  | Ex. 1* | Ex. 2* | Ex. 3 | Ex. 4 | Ex. 5 | Ex. 6 | Ex. 7 | Ex. 8 | Ex. 9 |
|---|---|---|---|---|---|---|---|---|---|
| $SiO_2$ | 67.116 | 67.123 | 67.156 | 67.140 | 67.184 | 61.514 | 58.798 | 67.160 | 67.439 |
| $Al_2O_3$ | 9.608 | 9.609 | 9.614 | 9.611 | 9.618 | 12.978 | 12.405 | 9.614 | 9.413 |
| $B_2O_3$ | 9.415 | 9.417 | 9.421 | 9.419 | 9.425 | 4.628 | 4.423 | 9.421 | 9.461 |
| $Li_2O$ | 3.843 | 0.000 | 3.845 | 4.843 | 3.847 | 7.758 | 7.416 | 3.845 | 5.792 |

TABLE 1A-continued

Glass-ceramic compositions with WO₃ and no MoO₃ (mol %)

| | Ex. 1* | Ex. 2* | Ex. 3 | Ex. 4 | Ex. 5 | Ex. 6 | Ex. 7 | Ex. 8 | Ex. 9 |
|---|---|---|---|---|---|---|---|---|---|
| $Na_2O$ | 4.407 | 8.240 | 5.991 | 4.994 | 5.598 | 1.827 | 1.746 | 4.410 | 2.743 |
| $K_2O$ | 1.585 | 1.586 | 0.000 | 0.021 | 0.397 | 0.033 | 0.032 | 1.586 | 1.593 |
| $Cs_2O$ | 0.000 | 0.000 | 0.000 | 0.000 | 0.000 | 0.000 | 0.000 | 0.000 | 0.000 |
| MgO | 0.000 | 0.000 | 0.000 | 0.000 | 0.000 | 0.000 | 0.000 | 0.000 | 0.000 |
| CaO | 0.130 | 0.131 | 0.080 | 0.080 | 0.036 | 0.139 | 0.132 | 0.065 | 0.127 |
| $SnO_2$ | 0.048 | 0.048 | 0.048 | 0.048 | 0.048 | 0.092 | 0.088 | 0.048 | 0.048 |
| $WO_3$ | 3.843 | 3.844 | 3.846 | 3.845 | 3.847 | 9.237 | 13.244 | 3.846 | 3.379 |
| $MoO_3$ | 0.000 | 0.000 | 0.000 | 0.000 | 0.000 | 0.000 | 0.000 | 0.000 | 0.000 |
| $P_2O_5$ | 0.000 | 0.000 | 0.000 | 0.000 | 0.000 | 1.792 | 1.713 | 0.000 | 0.000 |
| $V_2O_5$ | 0.000 | 0.000 | 0.000 | 0.000 | 0.000 | 0.000 | 0.000 | 0.000 | 0.000 |
| $Fe_2O_3$ | 0.006 | 0.004 | 0.000 | 0.000 | 0.000 | 0.003 | 0.002 | 0.005 | 0.004 |
| CuO | 0.000 | 0.000 | 0.000 | 0.000 | 0.000 | 0.000 | 0.000 | 0.000 | 0.000 |

Figure 3:
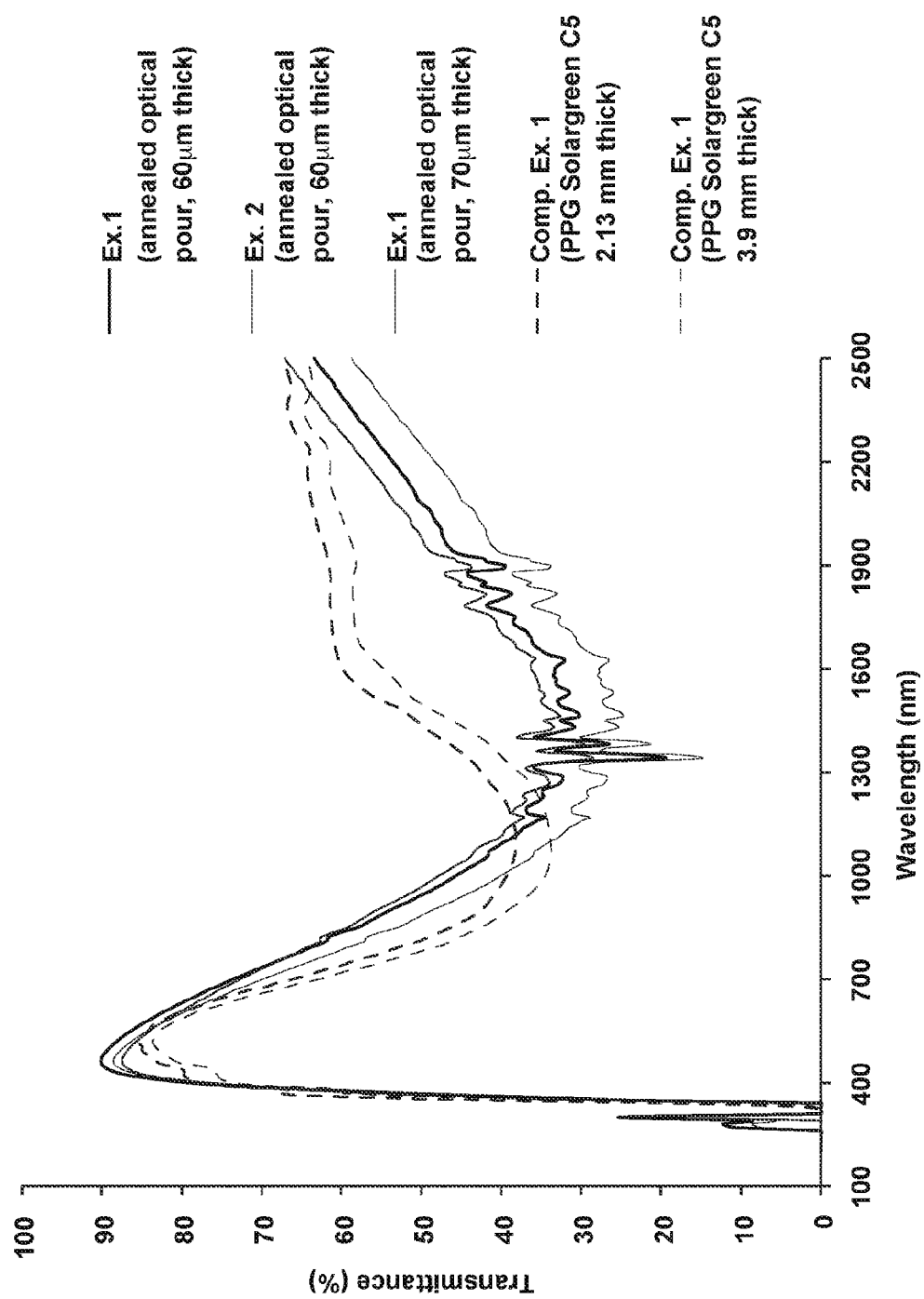
FIG. 3 is a plot of transmittance vs. wavelength of comparative soda lime, IR-absorptive glass compositions and tungsten oxide-containing glass-ceramic compositions, according to examples of the disclosure.

*See also FIG. 3 and its corresponding description

Table 1B lists various fusion compatible, peralkaline mixed molybdenum-tungsten glass-ceramic compositions (Exs. 10-18). In particular, each of these glass-ceramic compositions includes a combination of $WO_3$ and $MoO_3$, among other constituents. According to implementations of the disclosure, these compositions are suitable for laminate glass-ceramic articles for applications requiring IR and UV attenuation, along with either low VIS transmittance levels. Further, the Exs. 10-15 glass-ceramic compositions are particularly suited for fusion-compatible, UV- and IR-absorbing applications (e.g., automotive glazing, such as sunroofs) with relatively low VIS transmittance.

TABLE 1B

Glass-ceramic compositions with mixed amounts of MoO3 and WO₃ (mol %)

| | Ex. 10* | Ex. 11* | Ex. 12 | Ex. 13 | Ex. 14 | Ex. 15 | Ex. 16 | Ex. 17 | Ex. 18 |
|---|---|---|---|---|---|---|---|---|---|
| $SiO_2$ | 67.125 | 67.125 | 66.486 | 66.645 | 62.968 | 62.378 | 65.236 | 65.236 | 67.151 |
| $Al_2O_3$ | 9.609 | 9.609 | 9.518 | 9.540 | 13.285 | 13.160 | 11.601 | 11.601 | 9.613 |
| $B_2O_3$ | 9.417 | 9.417 | 9.327 | 9.350 | 4.737 | 4.693 | 7.037 | 7.037 | 9.421 |
| $Li_2O$ | 3.843 | 3.843 | 3.807 | 3.816 | 7.942 | 7.867 | 4.374 | 4.374 | 6.766 |
| $Na_2O$ | 4.407 | 4.407 | 4.365 | 4.376 | 1.870 | 1.853 | 7.775 | 7.775 | 3.078 |
| $K_2O$ | 1.586 | 1.586 | 1.570 | 1.574 | 0.034 | 0.034 | 0.000 | 0.000 | 0.029 |
| $Cs_2O$ | 0.000 | 0.000 | 0.000 | 0.000 | 0.000 | 0.000 | 0.000 | 0.000 | 0.000 |
| MgO | 0.000 | 0.000 | 0.000 | 0.000 | 0.000 | 0.000 | 0.000 | 0.000 | 0.000 |
| CaO | 0.121 | 0.121 | 0.120 | 0.120 | 0.142 | 0.140 | 0.079 | 0.079 | 0.002 |
| $SnO_2$ | 0.048 | 0.048 | 0.048 | 0.048 | 0.095 | 0.094 | 0.095 | 0.095 | 0.096 |
| $WO_3$ | 2.883 | 1.922 | 2.855 | 1.908 | 6.146 | 7.025 | 2.853 | 1.902 | 2.884 |
| $MoO_3$ | 0.961 | 1.922 | 1.904 | 2.624 | 0.945 | 0.937 | 0.951 | 1.902 | 0.961 |
| $P_2O_5$ | 0.000 | 0.000 | 0.000 | 0.000 | 1.834 | 1.817 | 0.000 | 0.000 | 0.000 |
| $V_2O_5$ | 0.000 | 0.000 | 0.000 | 0.000 | 0.000 | 0.000 | 0.000 | 0.000 | 0.000 |
| $Fe_2O_3$ | 0.000 | 0.000 | 0.000 | 0.000 | 0.003 | 0.002 | 0.000 | 0.000 | 0.000 |
| CuO | 0.000 | 0.000 | 0.000 | 0.000 | 0.000 | 0.000 | 0.000 | 0.000 | 0.000 |

*See also FIG. 4A and its corresponding description

Table 1C lists various peraluminous pure molybdenum bronze glass-ceramic compositions (i.e., Exs. 19-23). In particular, each of these glass-ceramic compositions includes $MoO_3$ and no intentional addition of $WO_3$, among other constituents. According to implementations of the disclosure, these compositions are suitable for laminate glass-ceramic articles for applications requiring IR and UV attenuation, along with either low VIS transmittance levels. Further, the Exs. 19-21 glass-ceramic compositions are particularly suited for fusion-compatible, UV- and IR-absorbing applications (e.g., automotive glazing, such as sunroofs) with relatively low VIS transmittance.

TABLE 1C

Glass-ceramic compositions with MoO₃ and no WO₃ (mol %)

| | Ex. 19* | Ex. 20 | Ex. 21 | Ex. 22 | Ex. 23 |
|---|---|---|---|---|---|
| $SiO_2$ | 63.902 | 65.315 | 60.153 | 63.907 | 63.901 |
| $Al_2O_3$ | 9.000 | 13.958 | 13.958 | 9.000 | 9.000 |
| $B_2O_3$ | 19.999 | 13.472 | 13.472 | 20.001 | 19.999 |
| $Li_2O$ | 2.999 | 3.066 | 4.088 | 0.000 | 0.000 |
| $Na_2O$ | 0.000 | 0.000 | 0.000 | 2.991 | 0.000 |
| $K_2O$ | 0.000 | 0.000 | 0.000 | 0.000 | 3.000 |
| $Cs_2O$ | 0.000 | 0.000 | 0.000 | 0.000 | 0.000 |

TABLE 1C-continued

Glass-ceramic compositions with MoO₃ and no WO₃ (mol %)

|  | Ex. 19* | Ex. 20 | Ex. 21 | Ex. 22 | Ex. 23 |
|---|---|---|---|---|---|
| $SnO_2$ | 0.100 | 0.102 | 0.153 | 0.100 | 0.100 |
| $WO_3$ | 0.000 | 0.000 | 0.000 | 0.000 | 0.000 |
| $MoO_3$ | 4.000 | 4.088 | 8.176 | 4.000 | 4.000 |
| MgO | 0.000 | 0.000 | 0.000 | 0.000 | 0.000 |
| CaO | 0.000 | 0.000 | 0.000 | 0.000 | 0.000 |
| $V_2O_5$ | 0.000 | 0.000 | 0.000 | 0.000 | 0.000 |

*See also FIG. 4B and its corresponding description

Finally, Table 1D below lists various mixed tungsten and vanadium oxide-containing glass-ceramic compositions (i.e., Exs. 24-29). In particular, each of these glass-ceramic compositions includes $V_2O_5$ and $WO_3$, among other constituents. According to implementations of the disclosure, these compositions are suitable for laminate glass-ceramic articles for applications requiring IR and UV attenuation, along with either low VIS transmittance levels. Further, the Ex. 24 glass-ceramic composition is particularly suited for fusion-compatible, UV- and IR-absorbing applications (e.g., automotive glazing, such as sunroofs) with relatively low VIS transmittance.

TABLE 1D

Glass-ceramic compositions with mixed amounts of WO₃ and V₂O₅ (mol %)

|  | Ex. 24 | Ex. 25 | Ex. 26 | Ex. 27 | Ex. 28 | Ex. 29 |
|---|---|---|---|---|---|---|
| $SiO_2$ | 67.155 | 67.102 | 67.105 | 67.287 | 67.116 | 66.955 |
| $Al_2O_3$ | 9.613 | 9.606 | 9.606 | 9.632 | 9.608 | 9.585 |
| $B_2O_3$ | 9.421 | 9.414 | 9.414 | 9.440 | 9.416 | 9.393 |
| $Li_2O$ | 4.844 | 3.842 | 3.842 | 4.853 | 4.841 | 4.829 |
| $Na_2O$ | 4.995 | 4.406 | 4.406 | 4.813 | 4.992 | 4.980 |
| $K_2O$ | 0.021 | 1.585 | 1.585 | 0.021 | 0.021 | 0.021 |
| $Cs_2O$ | 0.000 | 0.000 | 0.000 | 0.000 | 0.000 | 0.000 |
| $SnO_2$ | 0.048 | 0.048 | 0.048 | 0.048 | 0.048 | 0.048 |
| $WO_3$ | 3.845 | 3.842 | 3.843 | 3.853 | 3.843 | 3.834 |
| $MoO_3$ | 0.000 | 0.000 | 0.000 | 0.000 | 0.000 | 0.000 |
| MgO | 0.000 | 0.000 | 0.000 | 0.000 | 0.000 | 0.000 |
| CaO | 0.019 | 0.121 | 0.121 | 0.019 | 0.019 | 0.019 |
| $V_2O_5$ | 0.038 | 0.034 | 0.029 | 0.034 | 0.096 | 0.335 |

According to embodiments, the glass-ceramic materials of the disclosure, including those employed in the clad glass-ceramic layers 10 or core glass-ceramic layer 110 of the laminate glass-ceramic articles 100 and 200, respectively (see FIGS. 1 and 2), can be made by employing a melt quench process, followed by a heat treatment. Appropriate ratios of the constituents may be mixed and blended by turbulent mixing and/or ball milling. The batched material is then melted at temperatures ranging from about 1500° C. to about 1700° C. for a predetermined time. In some implementations, the predetermined time ranges from about 6 to about 12 hours, after which time the resulting melt can be cast or formed and then annealed, as understood by those with skill in the field of the disclosure. In some embodiments, the melt can be annealed between about 500° C. and about 600° C. to define an annealed melt, which is the form of a glass.

At this stage of the method, the annealed melt is heat treated between about 500° C. to about 1000° C. from about 5 minutes to about 48 hours to form the glass-ceramic. In embodiments, the heat treating step is conducted at or slightly above the annealing point of the glass-ceramic, and below its softening point, to develop one or more crystalline tungstate phases. In some embodiments, the annealed melt is heat treated between about 500° C. and about 700° C. from about 5 minutes to about 24 hours, for example, 5 minutes to 200 minutes, to form the glass-ceramic. According to some embodiments, the annealed melt is heat treated between about 650° C. and about 725° C. from about 45 minutes to about 3 hours to form the glass-ceramic. In another implementation, the annealed melt is heat treated according to a temperature and time to obtain particular optical properties, e.g., the various total transmittance levels outlined earlier in the disclosure within the visible spectrum, NIR spectrum and UV spectrum. Further, as is outlined below in the examples, additional heat treatment temperatures and times can be employed to obtain glass-ceramic materials according to the principles of the disclosure.

With further regard to the foregoing methods of making the glass-ceramics of the disclosure, it has been observed that compositions with pure tungsten (e.g., as listed in Table 1A); mixed molybdenum and tungsten content (e.g., as listed in Table 1B); pure molybdenum (i.e., as listed in Table 1C); and mixed vanadium and tungsten content (e.g., as listed in Table 1D) that are slightly peralkaline (e.g., $R_2O$—$Al_2O_3$>~0.25 mol %) have resulted in the formation of both a glass and dense liquid phase. In particular, a low viscosity liquid was observed during the step in which the glass-ceramic was poured into an optical patty from a crucible. X-ray diffraction (XRD) analysis revealed that this low viscosity liquid phase was a mixture of various stoichiometric alkali tungstates (e.g., $R_2WO_4$, where R=Li, Na, K and/or Cs). Additional experimentation led to the unexpected realization that the concentration of the alkali tungstate second phase could be reduced by additional and more thorough mixing of the as-formed glass-ceramic (e.g., as made according to the foregoing method, and then pulverized or otherwise reduced to particles and chunks), and then re-melting the mixture at a high temperature (i.e., at or above 1500° C.). Further, additional improvements were observed by employing small batch sizes (e.g., ~1000 g or less). The net result is that the glass-ceramic materials of the disclosure can be formed as a homogenous, single-phase glass (e.g., as it would exist prior to heat treatment). Accordingly, in another implementation of the foregoing method of making a glass-ceramic, the method can include the following additional steps: reducing the melt to a plurality of particles; re-mixing the melt comprising a plurality of particles into a second batch; re-melting the second batch between about 1500° C. and about 1700° C. to form a second melt. The reducing, re-mixing and re-melting steps are conducted after the step of melting the batch and before the step of annealing the melt. Further, the melt in the step of annealing is the second melt.

Referring again to the foregoing methods of making the glass-ceramics of the disclosure, without being bound by theory, it is believed that the formation of an alkali tungstate phase occurs during the initial stages of the melt, where tungsten oxide reacts with free or unbound alkali carbonates. Note that the terms "free" and "unbound" are used interchangeably to refer to an alkali that is not bonded to boron, aluminum and/or silicon atoms. Due to the high density of alkali tungstate relative to the borosilicate glass that is formed, it rapidly segregates and/or stratifies, pooling at the bottom of the crucible. Despite the phase not being truly immiscible, the alkali tungstate does not rapidly solubilize in the glass due to the significant difference in density. Accordingly, a single-melt process that is 1000 grams in weight or more (not including any subsequent heat treatment) may not always be successful in forming a single-phase glass from the glass-ceramic compositions of the disclosure; nevertheless, embodiments of the method that involve a subsequent mixing of particles of the as-formed glass and the alkali tungstate phase (i.e., as crushed into particulate) can be successfully made into a homogenous, single-phase glass. As noted earlier, the single-phase glass can be formed into a glass-ceramic via subsequent heat treatment steps.

According to another aspect of the disclosure, a method of making a laminate glass-ceramic article 100, 200 (see FIGS. 1 and 2) in a patterned form is provided. Inherent in these methods is the observation that exposure of the glass-ceramics (e.g., the clad glass-ceramic layers 10 employed in the laminate glass-ceramic article 100 depicted in FIG. 1) of the disclosure to certain laser wavelengths with sufficient pump power density to raise the local temperature to ≥600° C. causes the exposed region to turn from a blue or grey color to a transparent water white or yellow-tinted glass. Without being bound by theory, these transitions are believed to be due to the thermal decomposition of the UV and NIR-absorbing molybdenum crystalline phase or mixed molybdenum tungsten bronze crystalline phases. Thus, partial or complete decomposition of these phases can allow for the modulation of the optical extinction in the UV, VIS, and NIR regimes. In turn, a rastering of a laser along the surface of the laminate glass-ceramic article 100, 200 to selectively bleach desired regions of the layers containing glass-ceramic compositions, according to the disclosure, can result in patterns created within these layers, thus forming a laminate glass-ceramic article 100, 200 in a patterned form.

In embodiments, the glass-ceramic articles 100, 200 (see FIGS. 1 and 2) of the disclosure can be bleached or otherwise patterned by lasers operating at wavelengths including but not limited to 355 nm, 810 nm, and 10.6 μm. Further, laser operating at wavelengths below 500 nm and those operating between 700 and 1700 nm would also be suitable to bleach these glass-ceramics. The region of these articles exposed to these wavelengths (assuming there is a sufficient pump power density at these wavelengths) will turn from a blue or grey color to a transparent water white or faint yellow-tinted glass. By rastering the laser along the surface to selectively bleach desired regions of the article, e.g., within the clad glass-ceramic layers 10 of the article 100 depicted in FIG. 1 or within the core glass-ceramic layer 110 of the article 200 depicted in FIG. 2, patterns can be created within the laminate.

EXAMPLES

The following examples represent certain non-limiting examples of the glass-ceramic materials and articles of the disclosure, including the methods of making them.

According to an example, pure tungsten oxide-containing glass-ceramic compositions according to Ex. 1 and Ex. 2 from Table 1A were prepared as 0.06 and 0.07 mm substrates and compared against two incumbent PPG soda-lime IR-absorptive windshield glass compositions, PPG Solar-green C5 and C3.9 (designated "Comp. Ex. 1" and "Comp. Ex. 1-1", respectively), in the form of 2.13 mm thick substrates. As shown below in Tables 2A and 2B, average UV (280 to 380 nm), VIS (400-700 nm), and IR (700-2000 nm and 800-2500 nm) transmittance levels are reported for each of these samples. It is evident from the data in Tables 2A and 2B that the pure tungsten oxide-containing glass-ceramic substrates according to the disclosure, Ex. 1 and Ex. 2, are capable of achieving the same VIS specification as the incumbent soda-lime IR-absorptive windshield glazing, Comp. Ex. 1 and Comp. Ex. 1-1. Further, the physical property and viscosity data provided below in Table 2C for these pure tungsten oxide-containing glass-ceramic substrates also demonstrate that these substrates are suitable to be processed with a double fusion process as clad or core layers in the laminate glass-ceramic articles of the disclosure.

TABLE 2A

UV, VIS and IR transmittance of a pure $WO_3$-containing glass-ceramic (Ex. 1) and comparative tinted soda-lime glasses (Comp. Exs. 1, 1-1)

|  | Ex. 1, 0.07 mm | Comp. Ex. 1, 2.13 mm | Comp. Ex. 1-2, 2.13 mm |
|---|---|---|---|
| UV (280-380 nm, % T) | 18.2 | 35.5 | 29.2 |
| VIS (400-700 nm, % T) | 81.5 | 83.1 | 80.9 |
| IR (700-2000 nm, % T) | 35.9 | 47.5 | 43.1 |
| IR (800-2500 nm, % T) | 39.0 | 47.3 | 43.1 |

TABLE 2B

UV, VIS and IR transmittance of pure $WO_3$-containing glass-ceramics (Exs. 1 and 2) and comparative tinted soda-lime glasses (Comp. Exs. 1, 1-1)

|  | Ex. 1, 0.06 mm | Ex. 2, 0.06 mm | Comp. Ex. 1, 2.13 mm | Comp. Ex. 1-2, 2.13 mm |
|---|---|---|---|---|
| UV (280-380 nm, % T) | 21.2 | 20.5 | 35.5 | 29.2 |
| VIS (400-700 nm, % T) | 83.9 | 81.8 | 83.1 | 80.9 |
| IR (700-2000 nm, % T) | 41.3 | 43.6 | 47.5 | 43.1 |
| IR (800-2500 nm, % T) | 44.4 | 47.1 | 47.3 | 43.1 |

TABLE 2C

Physical property and viscosity data for pure $WO_3$-containing glass-ceramics (Exs. 1 and 2)

|  | Ex. 1 | Ex. 2 |
|---|---|---|
| Strain point (° C.) | 464.9 | 491.7 |
| Anneal point (° C.) | 514.3 | 546.3 |
| Softening point (° C.) | 777.4 | 823 |
| CTE ($10^{-7}$/° C.) | 57.5 | 65 |
| Density (g/cm³) | 2.468 | Not measured |
| T ($10^{9.76}$ poise) (° C.) | 621.3 | 678.4 |
| T ($10^{7.6}$ poise) (° C.) | 776.4 | 832.4 |
| T ($10^{6.5}$ poise) (° C.) | 880.8 | 936.7 |
| T ($10^{5.8}$ poise) (° C.) | 960.0 | 1016.2 |
| T ($10^{5.3}$ poise) (° C.) | 1024.1 | 1080.9 |
| T ($10^{5.1}$ poise) (° C.) | 1051.8 | 1108.9 |
| T ($10^{4.4}$ poise) (° C.) | 1159.7 | 1218.4 |
| T ($10^{3.7}$ poise) (° C.) | 1288.2 | 1349.6 |
| T ($10^{3.0}$ poise) (° C.) | 1443.9 | 1509.8 |
| T (200 poise) (° C.) | 1636.0 | 1709.5 |
| T (200000 poise) (° C.) | 1024.0 | 1080.7 |
| T (160000 poise) (° C.) | 1037.2 | 1094.1 |
| T (35000 poise) (° C.) | 1136.0 | 1194.2 |
| Liquidus viscosity (poise) | 516,946 | 407,869 |
| Liquidus temperature (° C.) | 970 | 1040 |

Referring now to FIG. 3, a plot of transmittance vs. wavelength of substrates fabricated from a comparative soda lime, IR-absorptive glass composition (Comp. Ex. 1, at thicknesses of 2.13 mm and 3.9 mm) and tungsten oxide-containing glass-ceramic compositions (Ex. 1, at thicknesses of 0.06 and 0.07 mm and Ex. 2, at a thickness of 0.07 mm). As is evident from FIG. 3, the substrates fabricated from the pure tungsten oxide-containing glass-ceramic compositions exhibit virtually identical high VIS transmittance and superior UV and IR absorbance relative to the comparative tinted soda lime glass substrates. Further, these substrates exhibit these optical data at reduced path lengths relative to the substrates fabricated from the comparative soda-lime glass compositions (i.e., 0.06 and 0.07 mm vs. 2.13 and 3.9 mm).

According to another example, mixed molybdenum and tungsten oxide-containing glass-ceramic compositions according to Ex. 10 and Ex. 11 from Table 1B were prepared as 100 and 200 μm thick substrates and compared against two commercial privacy/sunroof glasses, VG10 and GL20 (designated "Comp. Ex. 2" and "Comp. Ex. 3", respectively), in the form of 2.13 mm thick substrates. As shown below in Table 3, average UV (280 to 380 nm), VIS (400-700 nm), and IR (700-2000 nm and 800-2500 nm) transmittance levels are reported for each of these samples. It is evident from the data in Table 3 that the mixed molybdenum and tungsten oxide-containing glass-ceramic substrates according to the disclosure, Ex. 10 and Ex. 11, are capable of achieving the same VIS specification and superior IR and UV attenuation levels in comparison to the incumbent privacy glass compositions, Comp. Ex. 2 and Comp. Ex. 3. As such, these glass-ceramic compositions are suitable for laminate glass-ceramic applications requiring low VIS transmittance along with UV and IR attenuation, such as automotive and architectural glazing applications. Further, these mixed molybdenum and tungsten oxide-containing glass-ceramic substrates achieve these optical properties at significantly shorter path lengths (i.e., >21×thinner) in comparison to their comparative privacy glass counterparts.

TABLE 3

UV, VIS and IR transmittance of mixed $MoO_3$ and $WO_3$-containing glass-ceramics (Exs. 10 and 11) and comparative privacy glasses (Comp. Exs. 2 and 3)

|  | Ex. 10, 100 μm | Ex. 10, 200 μm | Ex. 11, 200 μm | Comp. Ex. 2, 2.13 mm | Comp. Ex. 3, 2.13 mm |
|---|---|---|---|---|---|
| UV (280-380 nm, % T) | 8.6 | 1.7 | 18.9 | not available | 22.9 |
| VIS (400-700 nm, % T) | 33.0 | 12.0 | 22.4 | 28.2 | 38.6 |
| IR (700-2000 nm, % T) | 30.8 | 13.0 | 26.8 | 26.0 | 38.2 |
| IR (800-2500 nm, % T) | 44.7 | 26.6 | 41.1 | 30.8 | 41.6 |

Figure 4:
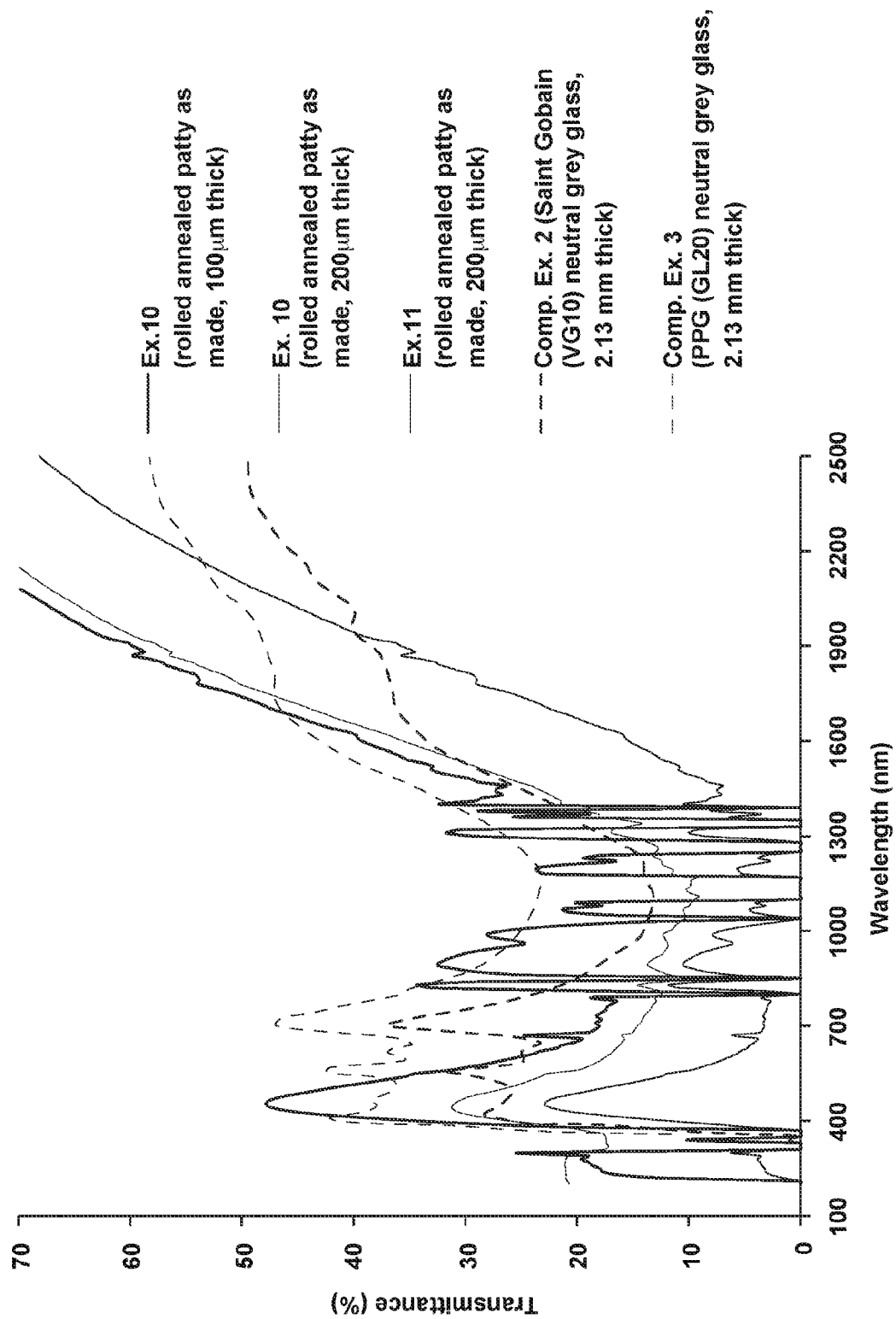
FIG. 4 is a plot of transmittance vs. wavelength of comparative neutral grey-tinted glass compositions and mixed tungsten oxide- and molybdenum oxide-containing glass-ceramic compositions, according to examples of the disclosure.

Referring now to FIG. 4, a plot of transmittance vs. wavelength of substrates fabricated from comparative privacy glass compositions (Comp. Ex. 2 and 3, at thicknesses of 2.13 mm) and mixed molybdenum and tungsten oxide-containing glass-ceramic compositions (Ex. 10, at thicknesses of 100 and 200 μm and Ex. 11, at a thickness of 200 μm). While FIG. 4 shows that there is a high transmittance variability observed as a function of wavelength in the IR region for Exs. 10 and 11, it is believed that the variability relates to the strongly-absorptive nature of these samples limiting the intensity of the signal that reaches the detector, despite the samples being particularly thin at 100 and 200 μm. Nevertheless, it is believed that the trends observed in the data are real. As is evident from FIG. 4, the substrates fabricated from the mixed molybdenum and tungsten oxide-containing glass-ceramic compositions exhibit virtually identical low VIS transmittance and superior UV and IR absorbance relative to the comparative tinted soda lime glass substrates. Further, these substrates exhibit these optical data at reduced path lengths relative to the substrates fabricated from the comparative soda-lime glass compositions (i.e., 0.06 and 0.07 mm vs. 2.13 and 3.9 mm).

According to another example, pure molybdenum oxide-containing glass-ceramic compositions according to Ex. 19 from Table 1C were prepared as 200 and 250 μm substrates and compared against two commercial privacy/sunroof glasses, VG10 and GL20 (designated "Comp. Ex. 2" and "Comp. Ex. 3", respectively), in the form of 2.13 mm thick substrates. As shown below in Table 4, average UV (280 to 380 nm), VIS (400-700 nm), and IR (700-2000 nm and 800-2500 nm) transmittance levels are reported for each of these samples. It is evident from the data in Table 4 that the molybdenum oxide-containing glass-ceramic substrates according to the disclosure, Ex. 19, are capable of achieving the same VIS specification and superior IR and UV attenuation levels in comparison to the incumbent privacy glass compositions, Comp. Ex. 2 and Comp. Ex. 3. As such, these glass-ceramic compositions are suitable for laminate glass-ceramic applications requiring low VIS transmittance along with UV and IR attenuation, such as automotive and architectural glazing applications. Further, these molybdenum oxide-containing glass-ceramic substrates achieve these optical properties and significantly shorter path lengths in comparison to their comparative privacy glass counterparts (i.e., about 200-250 μm vs. 2130 μm).

TABLE 4

UV, VIS and IR transmittance of a pure $MoO_3$-containing glass-ceramic (Ex. 19) and comparative privacy glasses (Comp. Exs. 2 and 3)

|  | Ex. 19, 200 μm | Ex. 19, 250 μm | Comp. Ex. 2, 2.13 mm | Comp. Ex. 3, 2.13 mm |
|---|---|---|---|---|
| UV (280-380 nm, % T) | 0.9 | 0.4 | not available | 22.9 |
| VIS (400-700 nm, % T) | 5.6 | 3.0 | 28.2 | 38.6 |
| IR (700-2000 nm, % T) | 2.7 | 1.1 | 26.0 | 38.2 |
| IR (800-2500 nm, % T) | 4.3 | 2.0 | 30.8 | 41.6 |

Figure 5:
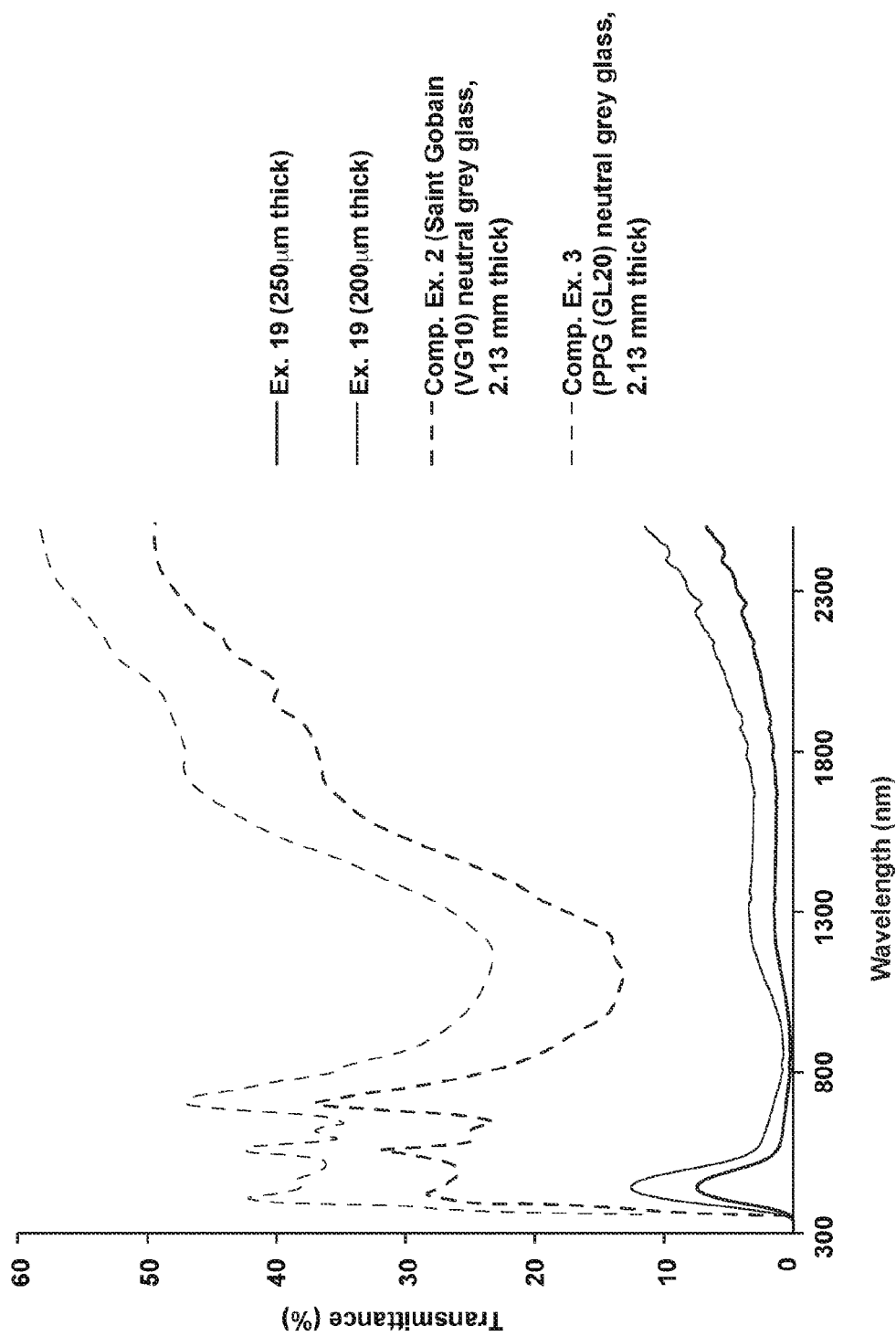
FIG. 5 is a plot of transmittance vs. wavelength of comparative neutral grey-tinted glass compositions and a molybdenum oxide-containing glass-ceramic composition, according to at least one example of the disclosure.

Referring now to FIG. 5, a plot of transmittance vs. wavelength of substrates fabricated from comparative privacy glass compositions (Comp. Ex. 2 and 3, at thicknesses of 2.13 mm) and molybdenum oxide-containing glass-ceramic compositions (Ex. 19, at thicknesses of 200 and 250 μm). As is evident from FIG. 5, the substrates fabricated from the molybdenum oxide-containing glass-ceramic compositions exhibit virtually identical low VIS transmittance and superior UV and IR absorbance relative to the comparative tinted soda lime glass substrates. Further, these substrates exhibit these optical data at reduced path lengths relative to the substrates fabricated from the comparative privacy glass compositions (i.e., 200-250 μm vs. 2.13 mm).

According to another example, mixed molybdenum and tungsten oxide-containing glass-ceramic compositions shown in Table 5 below were prepared by melting in a bottom delivery melter at temperatures of about 1525° C. for approximately eighteen hours and cast into blocks that were left to cool in ambient air.

TABLE 5

Glass-ceramic compositions with mixed amounts of $WO_3$ and $MoO_3$ (mol %)

|  | Ex. 30 | Ex. 31 |
|---|---|---|
| $SiO_2$ | 66.454 | 66.454 |
| $Al_2O_3$ | 9.513 | 9.513 |
| $B_2O_3$ | 9.323 | 9.323 |
| $Li_2O$ | 3.805 | 3.805 |
| $Na_2O$ | 4.363 | 4.363 |
| $K_2O$ | 1.570 | 1.570 |
| CaO | 0.120 | 0.120 |
| $SnO_2$ | 0.095 | 0.095 |
| $WO_3$ | 3.805 | 4.281 |
| $MoO_3$ | 0.951 | 0.476 |

The blocks were re-melted in a double fusion apparatus (e.g., as described in U.S. Pat. No. 4,214,886, which is incorporated herein by reference in its entirety) to form laminate glass articles as described herein. The clad layers of the laminate glass articles were formed from the composition of Ex. 30 or Ex. 31, respectively. The core layers of the laminate glass articles were formed from a glass composition commercially available from Corning Incorporated (Corning, N.Y.) as Gorilla® Glass and having, on an oxide basis, 64.5 mol % $SiO_2$, 7 mol % $B_2O_3$, 14 mol % $Al_2O_3$, 14 mol % $Na_2O$, 0.5 mol % $K_2O$, and less than 0.1 mol % of each of CaO, $Fe_2O_3$, and $SnO_2$. The thickness of the laminate glass articles varied from approximately 0.7 mm to approximately 1.5 mm with a core to clad thickness ratio of approximately 4 to 1.

Figure 6:
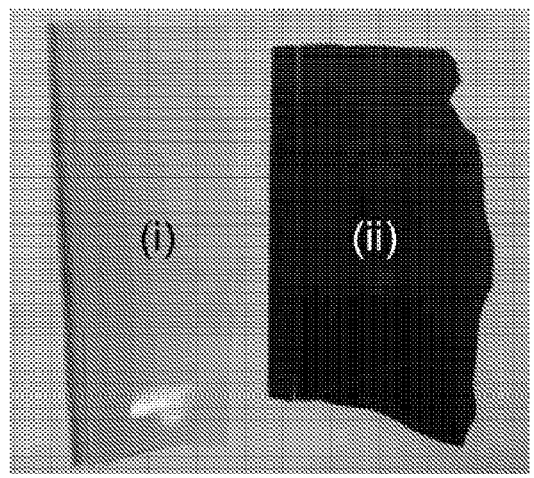
FIG. 6 is a photograph of an exemplary laminate glass article prior to thermal treatment (i) and a corresponding laminate glass-ceramic article after thermal treatment (ii).

The laminate glass articles were subjected to a thermal treatment at 550° C. for times of about 15 minutes to about 60 minutes followed by cooling to 475° C. at 1° C./minute to form laminate glass-ceramic articles. FIG. 6 is a photograph showing the laminate glass articles prior to the thermal treatment (i) and the laminate glass-ceramic articles after the thermal treatment (ii). Prior to the thermal treatment, the laminate glass articles were largely transparent and had a faint blue hue. After the thermal treatment, laminate glass-ceramic articles became a deep blue color.

Figure 7:
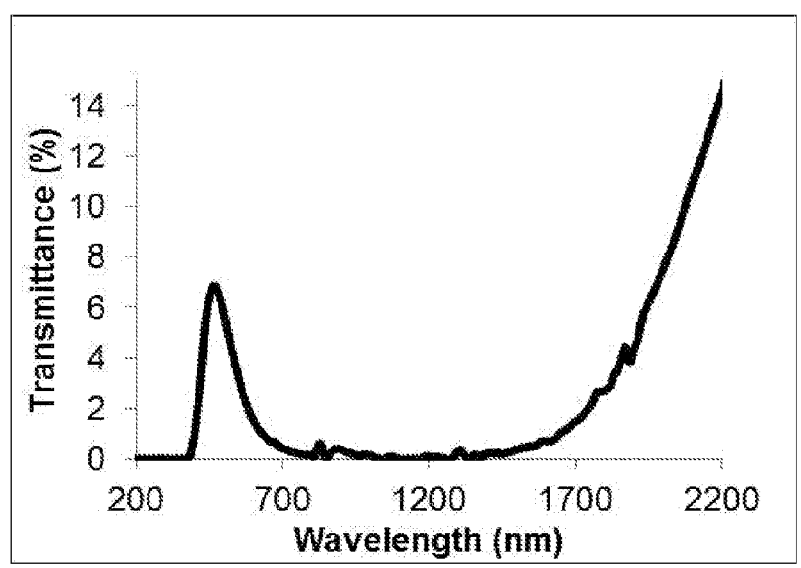
FIG. 7 is a plot showing the optical transmittance spectrum of the laminate glass-ceramic article shown in FIG. 6.
Figure 8:
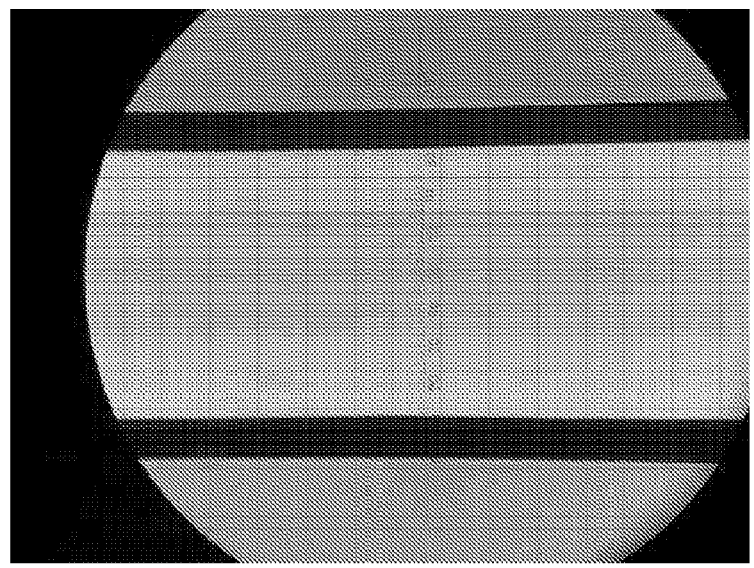
FIG. 8 is an optical microscope cross-section of the laminate glass-ceramic article shown in FIG. 6 at 100× magnification.

FIG. 7 is a plot showing the optical transmittance spectrum of the laminate glass-ceramic article (ii) shown in FIG. 6, which had a total thickness of 1.0 mm and a total clad thickness of 0.2 mm. FIG. 8 is an optical microscope cross-section of the laminate glass-ceramic article shown in FIG. 6 at 100× magnification (e.g., 1 tick equals 9.75 microns). In this image the clear region at the center is the core layer, and the two parallel black rectangular regions are the clad layers. The CTE of the clad layers was $57.3 \times 10^{-7}/°$ C., and the CTE of the core layer was $79.4 \times 10^{-7}/°$ C., giving a CTE difference of about $22 \times 10^{-7}/°$ C. Such a CTE difference can enable the laminate glass-ceramic article to be mechanically strengthened as descried herein.

Table 6 shows several performance attributes commonly used to quantify optical properties of automotive glazing calculated for (a) the 1.0 mm thick sheet of the laminate glass-ceramic article with clad layers formed from the composition of Ex. 30 (e.g., as shown in FIG. 6) (Ex. G1), (b) a 1.0 mm thick sheet of a tungsten containing glass-ceramic having, on an oxide basis, 67.1247 mol % $SiO_2$, 9.6091 mol % $Al_2O_3$, 9.4171 mol % $B_2O_3$, 3.8433 mol % $Li_2O$, 4.4073 mol % $Na_2O$, 1.5856 mol % $K_2O$, 0.1211 mol % CaO, 0.0480 mol % $SnO_2$, and 3.8438 mol % $WO_3$ (Comp. Ex. G2), and (c) sheets of tinted soda lime glass commercially available from Saint-Gobain (La Defense, Courbevoie, France) as VG10 at thicknesses of 3.85 mm (Comp. Ex. G3-1), 2.1 mm (Comp. Ex. G3-2), and 0.7 mm (Comp. Ex. G3-3). In Table 6, T_L is the total visible light transmittance (e.g., the weighted-average transmission of light through a glazing at a wavelength range of 380 nm to 780 nm, which can be determined in accordance with ISO 9050 Section 3.3). Additionally, T_DS is the total direct solar transmittance, which also can be referred to as Solar Transmission (Ts) or Energy Transmission (e.g., the weighted-average transmission of light through a glazing at a wavelength range of 300 nm to 2500 nm, which can be determined in accordance with ISO 13837 section 6.3.2). Additionally, T_TS is the total transmitted solar, which also can be referred to as Solar Factor (SF) or Total Solar Heat Transmission (TSHT) (e.g., the sum of T_DS plus the fraction of solar energy that is absorbed by the glazing and then re-radiated into a vehicle interior, which can be determined in accordance with ISO 13837-2008 Annex B & ISO 9050-2003 section 3.5). T_TS can be calculated for a parked car condition with wind speed of 4 m/s (14 km/hr) % with T_TS being equal to (% T_DS)+0.276*(% solar absorption). Additionally, R_DS is the reflected solar component (e.g., with nominally 4% Fresnel reflection, which can be determined in accordance with ISO 13837A). Additionally, T_E is the solar direct transmittance (e.g., which can be determined in accordance with ISO 9050). Additionally, T_UV is the UV transmittance (e.g., which can be determined in accordance with ISO 9050 and/or ISO 13837 A). Additionally, T_IR is the infrared transmittance (e.g., which can be determined in accordance with Volkswagen standard TL957).

TABLE 6

Performance Attributes of Various Exemplary Glazings

| | Ex. G1 | Comp. Ex. G2 | Comp. Ex. G3-1 | Comp. Ex. G3-2 | Comp. Ex. G3-3 |
|---|---|---|---|---|---|
| T_L (A/2°) | 2.6% | 1.5% | 10.6% | 28.1% | 61.7% |
| T_L (ISO 9050) | 3.2% | 1.9% | 10.7% | 28.3% | 61.9% |
| T_TS (ISO 13837A) | 28.0% | 27.1% | 32.8% | 44.0% | 68.1% |
| T_DS (ISO 13837A) | 2.0% | 0.8% | 8.8% | 24.4% | 58.2% |
| R_DS (ISO 13837A) | 4.0% | 4.0% | 4.3% | 4.6% | 5.9% |
| T_E (ISO 9050) | 2.1% | 0.8% | 8.7% | 24.4% | 58.1% |
| T_UV (ISO 9050) | 0.0% | 0.0% | 1.1% | 6.7% | 35.9% |
| T_UV (ISO 13837A) | 0.2% | 0.0% | 3.0% | 11.8% | 42.8% |
| T_IR (VW TL 957) | 1.4% | 0.0% | 7.0% | 21.0% | 55.3% |

As illustrated by the data shown in Table 6, the laminate glass-ceramic article of Ex. G1 has improved optical performance compared to the commercially available tinted soda-lime glass of Comp. Ex. G3 because it produces lower UV, VIS, and NIR transmittance, and lower total transmitted solar. Although the 1.0 mm thick monolith of Comp. Ex. G2 produces about a 0.9% lower T_TS compared to the laminate glass-ceramic article of Ex. G1, the total thickness of the clad layers in the laminate glass-ceramic article is 5 times thinner than the monolith, which can reduce the cost of manufacturing the glazing.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:
1. A laminate glass-ceramic article, comprising:
    a core glass layer having a first coefficient of thermal expansion (CTE); and
    a plurality of clad glass-ceramic layers, each having a CTE that is lower than or equal to the first CTE of the core glass layer,
    wherein a first of the clad glass-ceramic layers is laminated to a first surface of core glass layer and a second of the clad glass-ceramic layers is laminated to a second surface of the core glass layer,
    wherein a total thickness of the plurality of clad glass-ceramic layers is from about 0.05 mm to about 0.5 mm,
    wherein each of the clad glass-ceramic layers comprises:
        an alumino-boro-silicate glass,
        0 mol % ≤ $MoO_3$ ≤ 15 mol %,

0.1 mol % ≤ WO$_3$ 15 mol %,
1 mol % ≤ Al$_2$O$_3$ ≤ 20 mol %, and
0.1 mol % ≤ R$_2$O ≤ 15 mol %, R$_2$O is one or more of Li$_2$O, Na$_2$O, K$_2$O and Cs$_2$O,
wherein the WO$_3$ (mol %) plus the MoO$_3$ (mol %) is from 0.7 mol % to 19 mol %, and
wherein R$_2$O (mol %) minus the Al$_2$O$_3$ (mol %) is from −12 mol % to 4 mol %, and
wherein each of the glass-ceramic layers further comprises a glassy phase and at least one crystalline phase selected from the group consisting of a stoichiometric crystalline phase, a non-stoichiometric crystalline phase and a mixed stoichiometric and non-stoichiometric crystalline phase, and
wherein the at least one crystalline phase comprises a crystalline phase of M$_x$WO$_3$ and/or M$_y$MoO$_3$, wherein M is at least one of H, Li, Na, K, Rb, Cs, Mg, Ca, Sr, Sn, P, S, Ti, V, Cr, Mn, Fe, Co, Ni, Cu, Ga, Se, Zr, Nb, Ru, Rh, Pd, Ag, Cd, In, Sb, Te, La, Ce, Pr, Nd, Sm, Eu, Gd, Tb, Dy, Ho, Er, Tm, Yb, Lu, Ta, Os, Ir, Pt, Au, Tl, Pb, Bi, and U, and wherein 0≤x≤1 and 0≤y≤1.

2. The laminate article of claim 1, wherein each of the glass-ceramic layers further comprises:
40 mol % ≤ SiO$_2$ ≤ 80 mol %;
3 mol % ≤ B$_2$O$_3$ ≤ 50 mol %;
0 mol % ≤ RO ≤ 2 mol %, RO is one or more of MgO, CaO, SrO and BaO;
0 mol % ≤ P$_2$O$_5$ ≤ 3 mol %; and
0 mol % ≤ SnO$_2$ ≤ 0.5 mol %.

3. The laminate article of claim 2, wherein each of the glass-ceramic layers further comprises: 0.7 mol % ≤ WO$_3$ ≤ 15 mol %, and 0 mol % ≤ MoO$_3$ ≤ trace amounts, and further wherein the WO$_3$ (mol %) plus the MoO$_3$ (mol %) is from 0.7 mol % to 15 mol %.

4. The laminate article of claim 2, wherein each of the glass-ceramic layers further comprises: 0.1 mol % ≤ WO$_3$ ≤ 7 mol %, and 0.1 mol % ≤ MoO$_3$ ≤ 15 mol %.

5. The laminate article of claim 1, wherein a thickness of the core glass layer is from about 0.2 mm to about 2.8 mm.

6. The laminate article of claim 1, wherein the laminate glass-ceramic article further comprises a total transmittance of less than or equal to 5% at ultraviolet (UV) wavelengths below 390 nm and a total transmittance from about 1% to about 15% in the near infrared (NIR) spectrum from 700 nm to 1500 nm.

7. The laminate article of claim 6, wherein the laminate glass-ceramic article further comprises a total transmittance from about 1% to about 30% in the visible spectrum from 400 nm to 700 nm.

8. The laminate article of claim 6, wherein the laminate glass-ceramic article further comprises a total transmittance of greater than or equal to about 70% in the visible spectrum from 400 nm to 700 nm.

9. The laminate article of claim 1, wherein 0.1 mol % ≤ WO$_3$ ≤ 10 mol %.

10. The laminate article of claim 9, wherein each of the glass-ceramic layers further comprises:
40 mol % ≤ SiO$_2$ ≤ 80 mol %;
3 mol % ≤ B$_2$O$_3$ ≤ 50 mol %;
0 mol % ≤ RO ≤ 2 mol %, RO is one or more of MgO, CaO, SrO and BaO;
0 mol % ≤ P$_2$O$_5$ ≤ 3 mol %; and
0 mol % ≤ SnO$_2$ ≤ 0.5 mol %.

11. The laminate article of claim 9, wherein a thickness of the core glass layer is from about 0.2 mm to about 2.8 mm.

12. The laminate article of claim 11, wherein each of the glass-ceramic layers further comprises: 0.7 mol % ≤ WO$_3$ ≤ 15 mol %, and 0 mol % ≤ MoO$_3$ ≤ trace amounts, and further wherein the WO$_3$ (mol %) plus the MoO$_3$ (mol %) is from 0.7 mol % to 15 mol %.

13. The laminate article of claim 11, wherein each of the glass-ceramic layers further comprises: 0.1 mol % ≤ WO$_3$ ≤ 7 mol %, and 0.1 mol % ≤ MoO$_3$ ≤ 15 mol %.

14. The laminate article of claim 9, wherein the laminate glass-ceramic article further comprises a total transmittance of less than or equal to 5% at ultraviolet (UV) wavelengths below 390 nm and a total transmittance from about 1% to about 15% in the near infrared (NIR) spectrum from 700 nm to 1500 nm.

15. The laminate article of claim 14, wherein the laminate glass-ceramic article further comprises a total transmittance from about 1% to about 30% in the visible spectrum from 400 nm to 700 nm.

16. The laminate article of claim 14, wherein the laminate glass-ceramic article further comprises a total transmittance of greater than or equal to about 70% in the visible spectrum from 400 nm to 700 nm.

17. The laminate article of claim 9, wherein the at least one crystalline phase comprises ternary metal oxides of the general formula M'$_x$M"$_y$O$_z$, where M" is a transition metal or a combination of transition metals, M' is a metal or a combination of metals that differ from M", 2≤z≤5, and x and y are based on z and the valence of M' and M".

18. A laminate glass-ceramic article, comprising:
a core glass-ceramic layer having a first coefficient of thermal expansion (CTE); and
a plurality of clad glass layers, each having a CTE that is lower than or equal to the first CTE of the core glass-ceramic layer,
wherein a first of the clad glass layers is laminated to a first surface of core glass-ceramic layer and a second of the clad glass layers is laminated to a second surface of the core glass-ceramic layer,
wherein a total thickness of the plurality of clad glass layers is from about 0.05 mm to about 0.5 mm, and
wherein the core glass-ceramic layer comprises:
an alumino-boro-silicate glass,
0 mol % ≤ MoO$_3$ ≤ 15 mol %,
0.1 mol % ≤ WO$_3$ ≤ 15 mol %,
1 mol % ≤ Al$_2$O$_3$ ≤ 20 mol %, and
0.1 mol % ≤ R$_2$O ≤ 15 mol %, R$_2$O is one or more of Li$_2$O, Na$_2$O, K$_2$O and Cs$_2$O,
wherein the WO$_3$ (mol %) plus the MoO$_3$ (mol %) is from 0.7 mol % to 19 mol %, and
wherein R$_2$O (mol %) minus the Al$_2$O$_3$ (mol %) is from −12 mol % to 4 mol %,
wherein the glass-ceramic layer further comprises a glassy phase and at least one crystalline phase selected from the group consisting of a stoichiometric crystalline phase, a non-stoichiometric crystalline phase and a mixed stoichiometric and non-stoichiometric crystalline phase, and
wherein the at least one crystalline phase comprises a crystalline phase of M$_x$WO$_3$ and/or M$_y$MoO$_3$, wherein M is at least one of H, Li, Na, K, Rb, Cs, Mg, Ca, Sr, Sn, P, S, Ti, V, Cr, Mn, Fe, Co, Ni, Cu, Ga, Se, Zr, Nb, Ru, Rh, Pd, Ag, Cd, In, Sb, Te, La, Ce, Pr, Nd, Sm, Eu, Gd, Tb, Dy, Ho, Er, Tm, Yb, Lu, Ta, Os, Ir, Pt, Au, Tl, Pb, Bi, and U, and wherein 0≤x≤1 and 0≤y≤1.

19. The laminate article of claim 18, wherein the core glass-ceramic layer further comprises:
40 mol % ≤ SiO$_2$ ≤ 80 mol %;
3 mol % ≤ B$_2$O$_3$ ≤ 50 mol %;

0 mol %≤RO≤2 mol %, RO is one or more of MgO, CaO, SrO and BaO;
0 mol %≤$P_2O_5$≤3 mol %; and
0 mol %≤$SnO_2$≤0.5 mol %.

20. The laminate article of claim 19, wherein the core glass-ceramic layer further comprises: 0.7 mol %≤$WO_3$≤15 mol %, and 0 mol %≤$MoO_3$≤trace amounts, and further wherein the $WO_3$ (mol %) plus the $MoO_3$ (mol %) is from 0.7 mol % to 15 mol %.

21. The laminate article of claim 19, wherein the core glass-ceramic layer further comprises: 0.1 mol %≤$WO_3$≤7 mol %, and 0.1 mol %≤$MoO_3$≤15 mol %.

22. The laminate article of claim 18, wherein a thickness of the core glass-ceramic layer is from about 0.2 mm to about 2.8 mm.

23. The laminate article of claim 18, wherein the laminate article further comprises a total transmittance of less than or equal to 5% at ultraviolet (UV) wavelengths below 390 nm and a total transmittance from about 1% to about 15% in the near infrared (NIR) spectrum from 700 nm to 1500 nm.

24. The laminate article of claim 23, wherein the laminate glass-ceramic article further comprises a total transmittance from about 1% to about 30% in the visible spectrum from 400 nm to 700 nm.

25. A window, comprising:
a laminate glass-ceramic article, comprising:
   a core glass layer having a first coefficient of thermal expansion (CTE); and
   a plurality of clad glass-ceramic layers, each having a CTE that is lower than or equal to the first CTE of the core glass layer,
   wherein a first of the clad glass-ceramic layers is laminated to a first surface of core glass layer and a second of the clad glass-ceramic layers is laminated to a second surface of the core glass layer,
   wherein a total thickness of the plurality of clad glass-ceramic layers is from about 0.05 mm to about 0.5 mm,
   wherein each of the clad glass-ceramic layers comprises: an alumino-boro-silicate glass, 0 mol %≤$MoO_3$≤15 mol %, 0.1 mol %≤$WO_3$≤15 mol %, 1 mol %≤$Al_2O_3$≤20 mol %, and 0.1 mol %≤$R_2O$≤15 mol %, $R_2O$ is one or more of $Li_2O$, $Na_2O$, $K_2O$ and $Cs_2O$, wherein $WO_3$ (mol %) plus the $MoO_3$ (mol %) is from 0.7 mol % to 19 mol %, and wherein $R_2O$ (mol %) minus the $Al_2O_3$ (mol %) is from −12 mol % to 4 mol %,
   wherein each of the glass-ceramic layers further comprises a glassy phase and at least one crystalline phase selected from the group consisting of a stoichiometric crystalline phase, a non-stoichiometric crystalline phase and a mixed stoichiometric and non-stoichiometric crystalline phase,
   wherein the at least one crystalline phase comprises a crystalline phase of $M_xWO_3$ and/or $M_yMoO_3$, wherein M is at least one of H, Li, Na, K, Rb, Cs, Mg, Ca, Sr, Sn, P, S, Ti, V, Cr, Mn, Fe, Co, Ni, Cu, Ga, Se, Zr, Nb, Ru, Rh, Pd, Ag, Cd, In, Sb, Te, La, Ce, Pr, Nd, Sm, Eu, Gd, Tb, Dy, Ho, Er, Tm, Yb, Lu, Ta, Os, Ir, Pt, Au, TI, Pb, Bi, and U, and wherein 0≤x≤1 and 0≤y≤1, and
   wherein the laminate glass-ceramic article further comprises: (a) a total transmittance of less than or equal to 5% at ultraviolet (UV) wavelengths below 390 nm, (b) a total transmittance from about 1% to about 15% in the near infrared (NIR) spectrum from 700 nm to 1500 nm, and (c) a total transmittance from about 1% to about 30% in the visible spectrum from 400 nm to 700 nm.

26. A window, comprising:
a laminate glass-ceramic article, comprising:
   a core glass layer having a first coefficient of thermal expansion (CTE); and
   a plurality of clad glass-ceramic layers, each having a CTE that is lower than or equal to the first CTE of the core glass layer,
   wherein a first of the clad glass-ceramic layers is laminated to a first surface of core glass layer and a second of the clad glass-ceramic layers is laminated to a second surface of the core glass layer,
   wherein a total thickness of the plurality of clad glass-ceramic layers is from about 0.05 mm to about 0.5 mm, and
   wherein each of the clad glass-ceramic layers comprises: an alumino-boro-silicate glass, 0 mol %≤$MoO_3$≤15 mol %, 0.1 mol %≤$WO_3$≤15 mol %, 1 mol %≤$Al_2O_3$≤20 mol %, and 0.1 mol %≤$R_2O$≤15 mol %, $R_2O$ is one or more of $Li_2O$, $Na_2O$, $K_2O$ and $Cs_2O$, wherein $WO_3$ (mol %) plus the $MoO_3$ (mol %) is from 0.7 mol % to 19 mol %, and wherein $R_2O$ (mol %) minus the $Al_2O_3$ (mol %) is from −12 mol % to 4 mol %,
   wherein each of the glass-ceramic layers further comprises a glassy phase and at least one crystalline phase selected from the group consisting of a stoichiometric crystalline phase, a non-stoichiometric crystalline phase and a mixed stoichiometric and non-stoichiometric crystalline phase,
   wherein the at least one crystalline phase comprises a crystalline phase of $M_xWO_3$ and/or $M_yMoO_3$, wherein M is at least one of H, Li, Na, K, Rb, Cs, Mg, Ca, Sr, Sn, P, S, Ti, V, Cr, Mn, Fe, Co, Ni, Cu, Ga, Se, Zr, Nb, Ru, Rh, Pd, Ag, Cd, In, Sb, Te, La, Ce, Pr, Nd, Sm, Eu, Gd, Tb, Dy, Ho, Er, Tm, Yb, Lu, Ta, Os, Ir, Pt, Au, TI, Pb, Bi, and U, and wherein 0≤x≤1 and 0≤y≤1, and
   wherein the laminate glass-ceramic article further comprises: (a) a total transmittance of less than or equal to 5% at ultraviolet (UV) wavelengths below 390 nm, (b) a total transmittance from about 1% to about 15% in the near infrared (NIR) spectrum from 700 nm to 1500 nm, and (c) a total transmittance of greater than or equal to about 70% in the visible spectrum from 400 nm to 700 nm.

\* \* \* \* \*

UNITED STATES PATENT AND TRADEMARK OFFICE
CERTIFICATE OF CORRECTION

PATENT NO. : 11,351,756 B2
APPLICATION NO. : 16/771893
DATED : June 7, 2022
INVENTOR(S) : Matthew John Dejneka et al.

It is certified that error appears in the above-identified patent and that said Letters Patent is hereby corrected as shown below:

In the Claims

In Column 31, Line 1, in Claim 1, delete "$WO_3 15$" and insert -- $WO_3 \leq 15$ --.

Signed and Sealed this
Tenth Day of December, 2024

Katherine Kelly Vidal
*Director of the United States Patent and Trademark Office*